US011938559B2

(12) United States Patent
Ouchi et al.

(10) Patent No.: US 11,938,559 B2
(45) Date of Patent: Mar. 26, 2024

(54) STIR PIN, FRICTION STIR WELDING TOOL, AND MACHINE TOOL

(71) Applicant: Yamazaki Mazak Corporation, Niwa-gun (JP)

(72) Inventors: Seigo Ouchi, Niwa-gun (JP); Eiji Matsubara, Niwa-gun (JP); Masayasu Minatani, Niwa-gun (JP); Toru Murakami, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 17/710,885

(22) Filed: Mar. 31, 2022

(65) Prior Publication Data

US 2022/0226928 A1    Jul. 21, 2022

Related U.S. Application Data

(63) Continuation of application No. PCT/JP2019/039587, filed on Oct. 8, 2019.

(51) Int. Cl.
*B23K 20/00* (2006.01)
*B23K 20/12* (2006.01)
*B23K 20/26* (2006.01)

(52) U.S. Cl.
CPC ........ *B23K 20/1255* (2013.01); *B23K 20/126* (2013.01); *B23K 20/26* (2013.01)

(58) Field of Classification Search
CPC .............. B23K 20/125; B23K 20/1255; B23K 20/1235; B23K 20/126; B23K 2101/20
See application file for complete search history.

(56) References Cited

U.S. PATENT DOCUMENTS 7,581,665 B2 *  9/2009  Burton ............... B23K 20/1265
                                                                228/2.1
9,956,644 B2 *  5/2018  Foerg ................. B23K 20/1225
(Continued)

FOREIGN PATENT DOCUMENTS

CN         102574239       7/2012
CN         103459081       12/2013
(Continued)

OTHER PUBLICATIONS

CN109202266A english translation (Year: 2023).*
(Continued)

*Primary Examiner* — Erin B Saad
(74) *Attorney, Agent, or Firm* — MORI & WARD, LLP

(57) ABSTRACT

A stir pin includes a base end portion configured to be held rotatably about a first axis, a stirring portion provided to project from a shoulder member to be rotatable about the first axis together with the base end portion, and an intermediate portion including a second portion connected to the stirring portion to be rotatable about the first axis together with the stirring portion and having a second diameter passing through the first axis, and a first portion provided between and connected to the base end portion and the second portion to be rotatable about the first axis together with the base end portion and the second portion. The first portion has an end surface to which the second portion is connected and which has a maximum diameter larger than the second diameter. The end surface has a ring-shaped receiving surface configured to receive a material waste.

22 Claims, 15 Drawing Sheets

(56) References Cited

U.S. PATENT DOCUMENTS

| | | | | |
|---|---|---|---|---|
| 10,279,422 B2* | 5/2019 | Werz | ............... | B23K 20/1255 |
| 2007/0152015 A1* | 7/2007 | Burton | ............... | B23K 20/1255 |
| | | | | 228/2.1 |
| 2008/0006677 A1 | 1/2008 | Kumagai et al. | | |
| 2009/0236045 A1* | 9/2009 | Burton | ............... | B23K 20/1265 |
| | | | | 228/2.1 |
| 2012/0193401 A1 | 8/2012 | Hori et al. | | |
| 2012/0298724 A1 | 11/2012 | Kato et al. | | |
| 2015/0144602 A1 | 5/2015 | Draht et al. | | |
| 2017/0080527 A1 | 3/2017 | Weigl | | |
| 2020/0338664 A1 | 10/2020 | Hachiya et al. | | |
| 2020/0353557 A1 | 11/2020 | Hori et al. | | |
| 2020/0376590 A1 | 12/2020 | Weigl et al. | | |
| 2021/0094491 A1* | 4/2021 | Yamashita | ............... | G06F 1/26 |
| 2021/0339337 A1* | 11/2021 | Takeoka | ............... | B23K 20/125 |

FOREIGN PATENT DOCUMENTS

| | | |
|---|---|---|
| CN | 104227223 | 12/2014 |
| CN | 104540628 | 4/2015 |
| CN | 107030371 | 8/2017 |
| CN | 206382700 U | 8/2017 |
| CN | 109093245 | 12/2018 |
| CN | 109202266 | 1/2019 |
| DE | 102016007585 B3 | 11/2017 |
| JP | 2005-199281 | 7/2005 |
| JP | 2006-297434 | 11/2006 |
| JP | 2012-020288 | 2/2012 |
| JP | 2013-094790 | 5/2013 |
| JP | 2017-512656 | 5/2017 |
| JP | 2018-1178 | 1/2018 |
| JP | 6512727 B1 | 5/2019 |
| JP | 2019-516555 | 6/2019 |
| WO | WO 2019/0123678 | 6/2019 |

OTHER PUBLICATIONS

International Search Report for corresponding International Application No. PCT/JP2019/039587, dated Dec. 24, 2019.
Written Opinion for corresponding International Application No. No. PCT/JP2019/039587, dated Dec. 24, 2019.
Japanese Office Action for corresponding JP Application No. 2020-514644, dated Apr. 30, 2020 (w/ English machine translation).
Japanese Office Action for corresponding JP Application No. 2020-514644, dated Oct. 2, 2020 (w/ English machine translation).
Supplementary European Search Report for corresponding EP Application No. 19948460.1-1103, dated Nov. 18, 2022.
European Office Action for corresponding EP Application No. 19948460.1-1103, dated Nov. 30, 2022.
The International Preliminary Report on Patentability (Chapter I) with translation of Written Opinion for corresponding International Application No. PCT/JP2019/039587, dated Apr. 12, 2022.
Chinese Office Action for corresponding CN Application No. 201980101195.X, dated Mar. 1, 2023.
European Office Action for corresponding EP Application No. 19948460.1-1103, dated Jun. 19, 2023.
Chinese Office Action for corresponding CN Application No. 201980101195.X, dated Sep. 28, 2023.

* cited by examiner

STIR PIN, FRICTION STIR WELDING TOOL, AND MACHINE TOOL

CROSS-REFERENCE TO RELATED APPLICATIONS

The present application is a continuation application of International Application No. PCT/JP2019/039587, filed Oct. 8, 2019. The contents of this application are incorporated herein by reference in their entirety.

BACKGROUND OF THE INVENTION

Field of the Invention

The present invention relates to a stir pin, a friction stir welding tool, and a machine tool.

Discussion of the Background

Friction stir welding (Friction Stir Welding) is known. In friction stir welding, a tool pressed against two workpieces, which are joined objects, is rotated to weld the two workpieces together. More specifically, metal workpieces are softened by friction heat generated by the rotation of the tool. The softened metals are guided by the rotation of the tool to flow around the tool. Then, the metals flowing around the tool are solidified, so that the two workpieces are welded together.

As a related technique, JP 2018-1178A discloses a friction stir tool. The friction stir tool recited in JP 2018-1178A includes a stir probe and a shoulder. The stir probe has a flow-prevention surface that changes the flow direction of a flowing object from the axial direction of the stir probe to its radial direction. Flowing metal is prevented by the flow-prevention surface from flowing farther and accumulates in an annular flowing-object container. In the friction stir tool recited in JP 2018-1178A, the stir probe is directly connected to a rotational driving axis.

JP 6512727B1 discloses a friction stir welding tool. The friction stir welding tool recited in JP 6512727B1 includes a stir pin and a housing having a first surface. The housing has a discharge hole connecting a container hole formed on the first surface to the outside of the housing (through the discharge hole, excess metal is discharged).

SUMMARY OF THE INVENTION

According to one aspect of the present invention, a stir pin includes a base end portion configured to be held in a pin holder to be rotatable about a first axis, a stirring portion provided to project from a shoulder member to be rotatable with respect to the shoulder member about the first axis together with the base end portion, and an intermediate portion including a first portion and a second portion. The second portion is connected to the stirring portion to be rotatable about the first axis together with the stirring portion and has a second diameter passing through the first axis. The first portion is provided between and connected to the base end portion and the second portion to be rotatable about the first axis together with the base end portion and the second portion. The first portion has an end surface to which the second portion is connected coaxially with the first portion and which has a maximum diameter passing through the first axis larger than the second diameter. The end surface has a ring-shaped receiving surface configured to receive a material waste generated when the stirring portion performs a friction stirring.

According to another aspect of the present invention, a friction stir welding tool includes a shoulder member having a shoulder surface configured to press a workpiece, and a stir pin provided in the shoulder member rotatable about a first axis with respect to the shoulder member. The stir pin includes a base end portion configured to be held in a pin holder to be rotatable about the first axis, a stirring portion provided to project from the shoulder member to be rotatable with respect to the shoulder member about the first axis together with the base end portion, and an intermediate portion. The intermediate portion includes a second portion connected to the stirring portion to be rotatable about the first axis together with the stirring portion and having a second diameter passing through the first axis, and a first portion provided between and connected to the base end portion and the second portion to be rotatable about the first axis together with the base end portion and the second portion. The first portion has an end surface to which the second portion is connected coaxially with the first portion and which has a maximum diameter passing through the first axis larger than the second diameter. The end surface has a ring-shaped receiving surface configured to receive a material waste generated when the stirring portion performs a friction stirring.

According to the other aspect of the present invention, a machine tool includes a friction stir welding tool, a workpiece support member configured to support a workpiece, a tool support member supporting the friction stir welding tool, a first driver configured to move the tool support member relative to the workpiece support member, a second driver configured to rotate a stir pin, and a controller configured to control the first driver and the second driver. The friction stir welding tool includes a shoulder member having a shoulder surface configured to press a workpiece, a pin holder, and a stir pin provided in the shoulder member rotatable about a first axis with respect to the shoulder member. The stir pin includes a base end portion configured to be held in the pin holder to be rotatable about the first axis, a stirring portion provided to project from the shoulder member to be rotatable with respect to the shoulder member about the first axis together with the base end portion, and an intermediate portion. The intermediate portion includes a second portion connected to the stirring portion to be rotatable about the first axis together with the stirring portion and having a second diameter passing through the first axis, and a first portion provided between and connected to the base end portion and the second portion to be rotatable about the first axis together with the base end portion and the second portion. The first portion has an end surface to which the second portion is connected coaxially with the first portion and which has a maximum diameter passing through the first axis larger than the second diameter. The end surface has a ring-shaped receiving surface configured to receive a material waste generated when the stirring portion performs a friction stirring.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
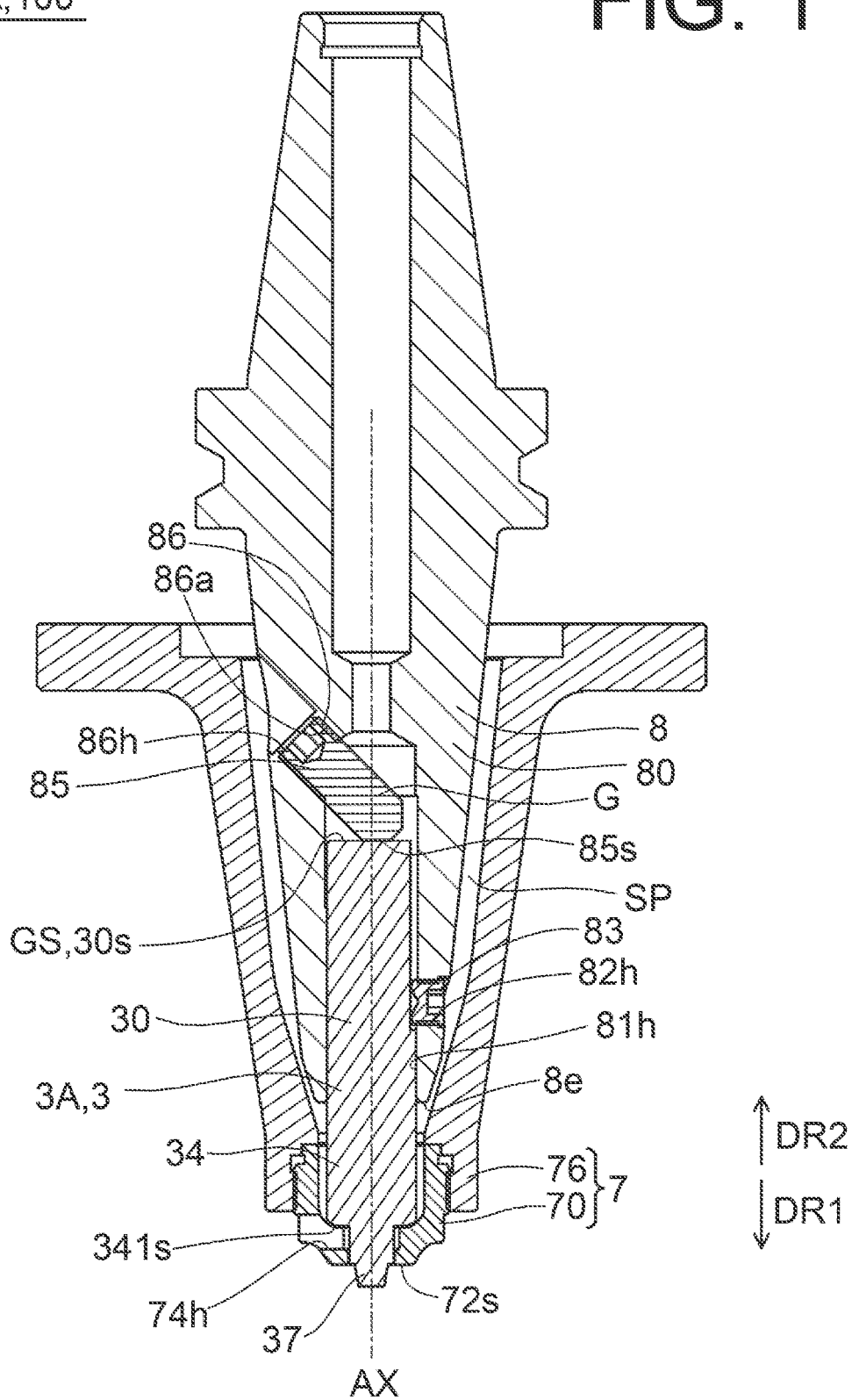
FIG. 1 is a schematic cross-sectional view of a friction stir welding tool according to a first embodiment, schematically illustrating this friction stir welding tool.

By referring to the accompanying drawings, description will be made with regard to a stir pin 3, a friction stir welding tool 100, and a machine tool 200 according to some embodiments of the present invention. It is noted that in the following description of the embodiments, identical reference numerals are used to denote identical portions, members, or components having identical functions, and redundant description of identical portions, members, or components will be eliminated or minimized.

Definitions of Directions and Terms

As used herein, the term "first direction DR1" is defined as a direction from a base end portion 30 of the stir pin 3 (or a base end portion of the shoulder member 7) toward a stirring portion 37 of the stir pin 3 (or a shoulder surface 72s of the shoulder member 7). Also as used herein, the term "second direction DR2" is defined as a direction opposite to the first direction DR1. For example, when a leading end portion of the stir pin 3 is pointed downward, the first direction DR1 corresponds to downward direction, and the second direction DR2 corresponds to upward direction.

As used herein, the term "machine tool" is intended to mean any machine to which a friction stir welding tool is attachable. The machine tool may be a combined multi-functional machine tool, which is capable of performing a plurality of different kinds of machining (an example is a machining center). An example of the machine tool is a machine capable of cutting, machining, grinding, or joining metal.

As used herein, the term "material waste" is intended to mean a piece of material detached from a workpiece as a result of a friction stirring. When the friction stir welding tool 100 joins metal workpieces together, the term "workpiece", as used herein, can be rephrased as "metal workpiece", and the term "material waste", as used herein, can be rephrased as "metal waste". This, however, does not exclude any configuration in which the friction stir welding tool 100 is used to join non-metal workpieces (for example, resin workpieces) together.

First Embodiment

Figure 2:
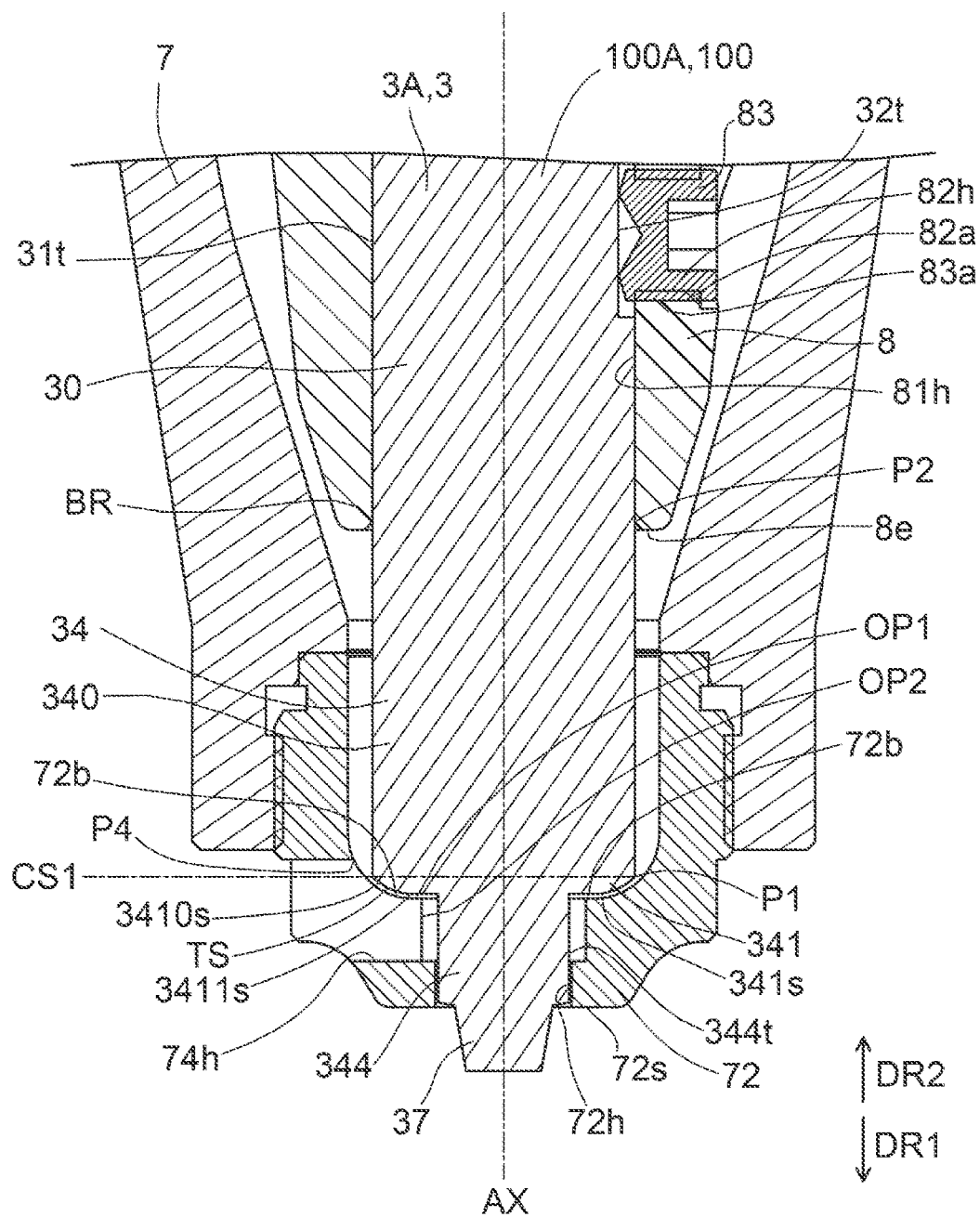
FIG. 2 is a schematic enlarged cross-sectional view of the friction stir welding tool according to the first embodiment, with part of the friction stir welding tool enlarged.
Figure 3A:
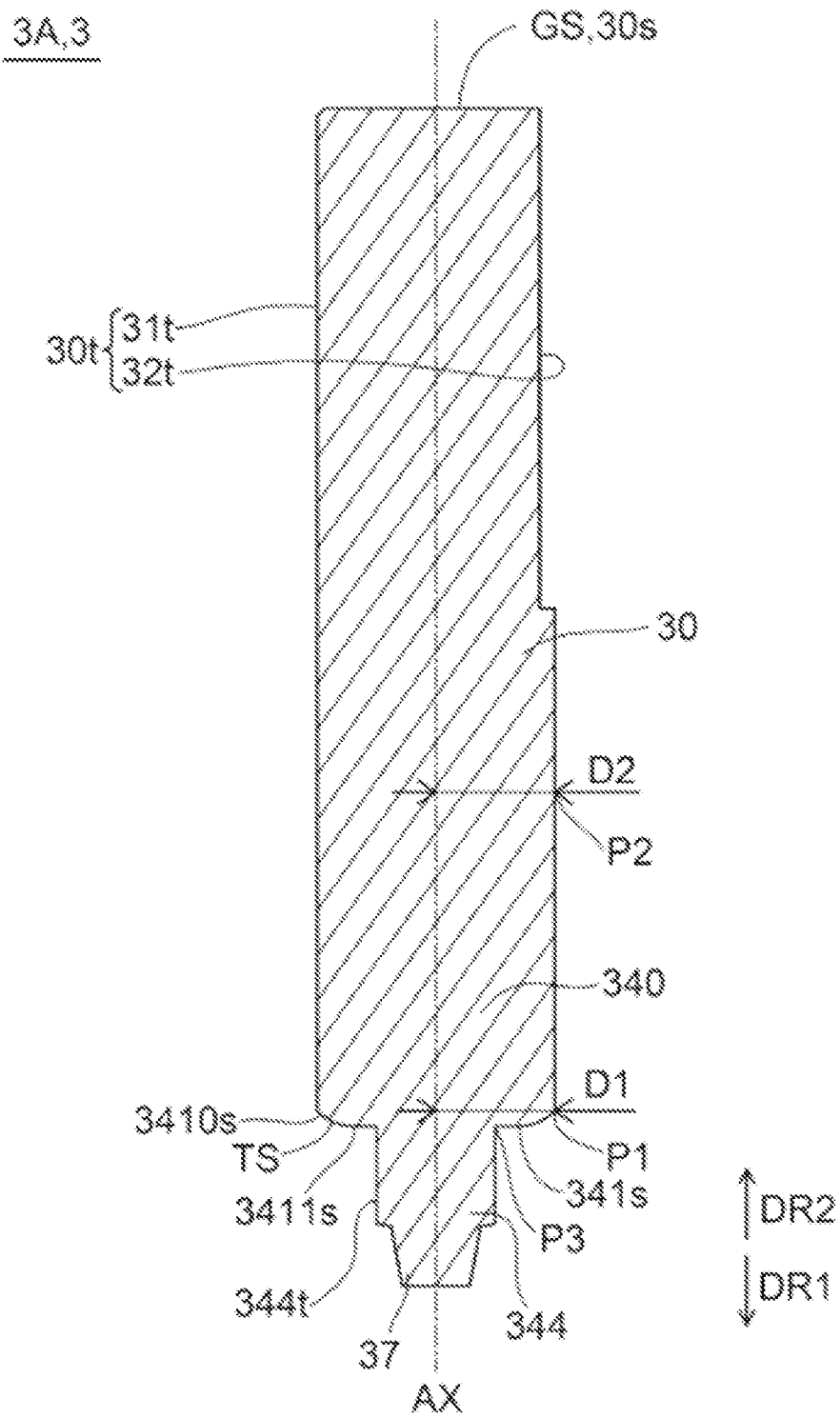
FIG. 3A is a schematic cross-sectional view of a stir pin according to the first embodiment, schematically illustrating this stir pin.
Figure 3B:
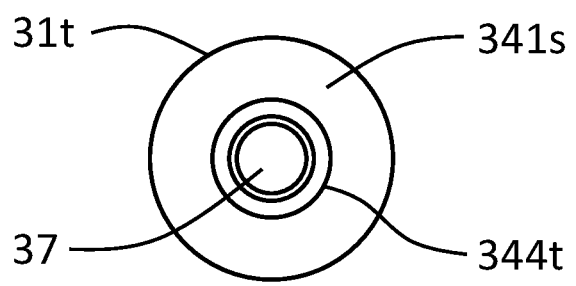
FIG. 3B is an end view of the stir pin of FIG. 3A according to the first embodiment

By referring to FIGS. 1 to 3B, a friction stir welding tool 100A and a stir pin 3A according to the first embodiment will be described. FIG. 1 is a schematic cross-sectional view of the friction stir welding tool 100A according to the first embodiment, schematically illustrating the friction stir welding tool 100A. FIG. 2 is a schematic enlarged cross-sectional view of the friction stir welding tool 100A according to the first embodiment, with part of the friction stir welding tool 100A enlarged. FIG. 3A is a schematic cross-sectional view of the stir pin 3A according to the first embodiment, schematically illustrating this stir pin 3A. FIG. 3B is an end view of the stir pin of FIG. 3A according to the first embodiment.

The friction stir welding tool 100A according to the first embodiment includes the shoulder member 7 and the stir pin 3A.

In the example illustrated in FIG. 1, the shoulder member 7 has the shoulder surface 72s. The shoulder surface 72s is for pressing workpieces, which are to-be-joined objects. The shoulder surface 72s is the end face of the shoulder member 7 on the first direction DR1 side. The shoulder surface 72s flattens material (of which the workpiece is made) softened by the rotation of the stir pin 3A. In the example illustrated in FIG. 1, the shoulder surface 72s is a surface perpendicular to the first direction DR1 (in other words, perpendicular to a first axis AX, described later).

In the example illustrated in FIG. 1, the shoulder member 7 includes: a first member 70, which has the shoulder surface 72s; and a second member 76. The first member 70 is mounted on the second member 76. In the example illustrated in FIG. 1, the first member 70 and the second member 76 are threaded to each other. The configuration in which the shoulder member 7 includes the first member 70 and the second member 76 makes the frequency by which the second member 76 is replaced lower than the frequency by which the first member 70 is replaced. As a result, the running cost involved in the use of the friction stir welding tool 100A is reduced.

In the example illustrated in FIG. 1, the shoulder member 7 is an assembly of two piece-parts (70, 76). Alternatively, the shoulder member 7 may be made up of a single piece-part or may be an assembly of three or more piece-parts.

In the example illustrated in FIG. 1, the shoulder member 7 has an internal space SP, which extends along the first direction DR1. In the internal space SP, at least a part of the stir pin 3A is provided. That is, the shoulder member 7 also functions as a housing member for at least a part of the stir pin 3A. In the example illustrated in FIG. 1, the entirety of the stir pin 3A is provided in the internal space SP of the shoulder member 7.

The stirring portion 37 of the stir pin 3A is inserted into workpieces with the stirring portion 37 in rotating state. The stir pin 3A may also be referred to as a probe. Then, frictional heat generated by the friction between the stir pin 3A and the workpieces makes the material of the workpieces (more specifically, metal material) softened. The softened material is stirred by the rotating stir pin 3A. Then, the stirred material is solidified, and thus the workpieces are joined together.

In the example illustrated in FIG. 1, the stir pin 3A is rotatable about the first axis AX relative to the shoulder member 7.

In the example illustrated in FIG. 1, the stir pin 3A rotates relative to the workpieces, whereas the shoulder surface 72s does not rotate relative to the workpieces. In the configuration in which the shoulder surface 72s does not rotate relative to the workpieces, the area over which frictional heat is generated is smaller than in the configuration in which the shoulder surface 72s rotates relative to the workpieces. This reduces the occurrence of workpiece deformation and burrs, resulting in a more satisfactory joint surface. Also in the configuration in which the shoulder surface 72s does not rotate relative to the workpieces, the area of contact between the workpieces and the rotatable member (more specifically, the stir pin 3A) is smaller. This requires a smaller level of force in pressing the rotatable member (more specifically, the stir pin 3A) against the workpieces in a friction stir welding.

The stir pin 3A includes the base end portion 30, an intermediate portion 34, and the stirring portion 37 (in other words, a leading end portion).

The base end portion 30 is a portion holdable by a pin holder 8. Upon rotation of the pin holder 8 about the first axis AX, the base end portion 30 held by the pin holder 8 rotates about the first axis AX relative to the shoulder member 7.

When the stir pin 3A is mounted on the pin holder 8, the base end portion 30 is provided further in the second direction DR2 than a leading end portion 8e of the pin holder 8.

The stirring portion 37 is a portion to be inserted into the workpieces and to stir the material of the workpieces. The stirring portion 37 protrudes beyond the shoulder surface 72s in the first direction DR1. The stirring portion 37 is rotatable about the first axis AX relative to the shoulder member 7. By rotating the stirring portion 37 about the first axis AX, the workpieces contacting the stirring portion 37 are stirred due to the friction between the workpieces and the stirring portion 37.

The intermediate portion 34 is a portion provided between the base end portion 30 and the stirring portion 37. In the example illustrated in FIG. 2, the portion of the stir pin 3A that is provided further in the first direction DR1 than the leading end portion 8e of the pin holder 8 and that is provided further in the second direction DR2 than the shoulder surface 72s is the intermediate portion 34.

The intermediate portion 34 is rotatable about the first axis AX together with the stirring portion 37. The intermediate portion 34 is also rotatable about the first axis AX together with the base end portion 30. For example, the stirring portion 37, the intermediate portion 34, and the base end portion 30 make up a single, integrally formed piece-part.

In the example illustrated in FIG. 2, the intermediate portion 34 includes a first portion 340 and a second portion 344, which is provided further in the first direction DR1 than the first portion 340. The first portion 340 has a first diameter which passes through the first axis AX. The second portion 344 has a second diameter which passes through the first axis AX.

The first portion 340 includes a protrusion 341, which protrudes beyond an outer surface 344t of the second portion 344 in a direction away from the first axis AX. Also, the surface (an example of "an end surface" recited in claims) of the protrusion 341 pointed in the first direction DR1 includes a ring-shaped receiving surface 341s, which receives a material waste generated as a result of a friction stirring. The maximum diameter of the ring-shaped receiving surface 341s is equal to the first diameter of the first portion 340. The maximum diameter of the ring-shaped receiving surface 341s is larger than the second diameter of the second portion 344.

Functions of the ring-shaped receiving surface 341s will be described.

The following description assumes a case in which the stirring portion 37 illustrated in the example illustrated in FIG. 2 rotates about the first axis AX with the workpieces and the stirring portion 37 in mutually contacting state. In this case, part of the material (in other words, material waste) detached from the workpieces as a result of a friction stirring enters the shoulder member 7 through a first through hole 72h, which is provided at a leading end portion 72 of the shoulder member 7. The material waste entering the shoulder member 7 is received by the ring-shaped receiving surface 341s. The material waste received by the ring-shaped receiving surface 341s is moved in a direction away from the first axis AX by centrifugal force generated by the ring-shaped receiving surface 341s rotating about the first axis AX.

If the material waste attached to the pin holder 8 is cooled and solidified, it is possible that the pin holder 8 and the stir pin 3A are fixed to each other via the material waste. In contrast, in the stir pin 3A and the friction stir welding tool 100A according to the first embodiment, the material waste is moved in a direction away from the first axis AX. Thus, the material waste is prevented from attaching to the pin holder 8 (in particular, to the boundary, BR, between the pin holder 8 and the stir pin 3A).

In the stir pin 3A and the friction stir welding tool 100A according to the first embodiment, the pin holder 8 and the stir pin 3A are prevented from being fixed to each other via the material waste. This makes the stir pin 3A easily detachable from the pin holder 8 (in other words, the stir pin 3A is made easily replaceable). Also, since no material waste enters the gap between the pin holder 8 and the stir pin 3A, the pin holder 8 is prevented from being deformed (more specifically, a first hole 81h, which receives the stir pin 3A, is prevented from being deformed).

Next, by referring to FIGS. 1 to 3B, an optional configuration employable in the first embodiment will be described.

Ring-shaped Receiving Surface 341s

In the example illustrated in FIGS. 3A and 3B, the outer diameter of the ring-shaped receiving surface 341s is equal to the outer diameter of the base end portion 30 of the stir pin 3A. In other words, a first imaginary circle is defined by an outermost edge P1 of the ring-shaped receiving surface 341s (that is, a point that is among the points on the ring-shaped receiving surface 341s and that is farthest from the first axis AX) rotating about the first axis AX, and the radius of the first imaginary circle is defined as a first radius D1 (an example of a half of "a maximum diameter"); and a second imaginary circle is defined by an outermost edge P2 of the base end portion 30 (that is, a point that is among the points on the outer circumferential surface of the base end portion 30 and that is farthest from the first axis AX) rotating about the first axis AX, and the radius of the second imaginary circle is defined as a second radius D2. In this case, the first radius D1 is equal to the second radius D2. Also in the example illustrated in FIG. 3A, the distance between the outermost edge P1 of the ring-shaped receiving surface 341s and the first axis AX is equal to the maximum distance between an arbitrary point on the outer circumferential surface of the stir pin 3A and the first axis AX.

As exemplified in FIG. 2, in the configuration in which the base end portion 30 of the stir pin 3A is held by the pin holder 8, the position of the outer surface of the base end portion 30 of the stir pin 3A is approximately equal to the position of the inner surface of the pin holder 8. With this configuration, the material waste received by the ring-shaped receiving surface 341s is moved by centrifugal force in a direction away from the first axis AX beyond the outermost edge P1 of the ring-shaped receiving surface 341s. Thus, the material waste is prevented from entering the gap between the outer surface of the base end portion 30 of the stir pin 3A and the inner surface of the pin holder 8.

Figure 6:
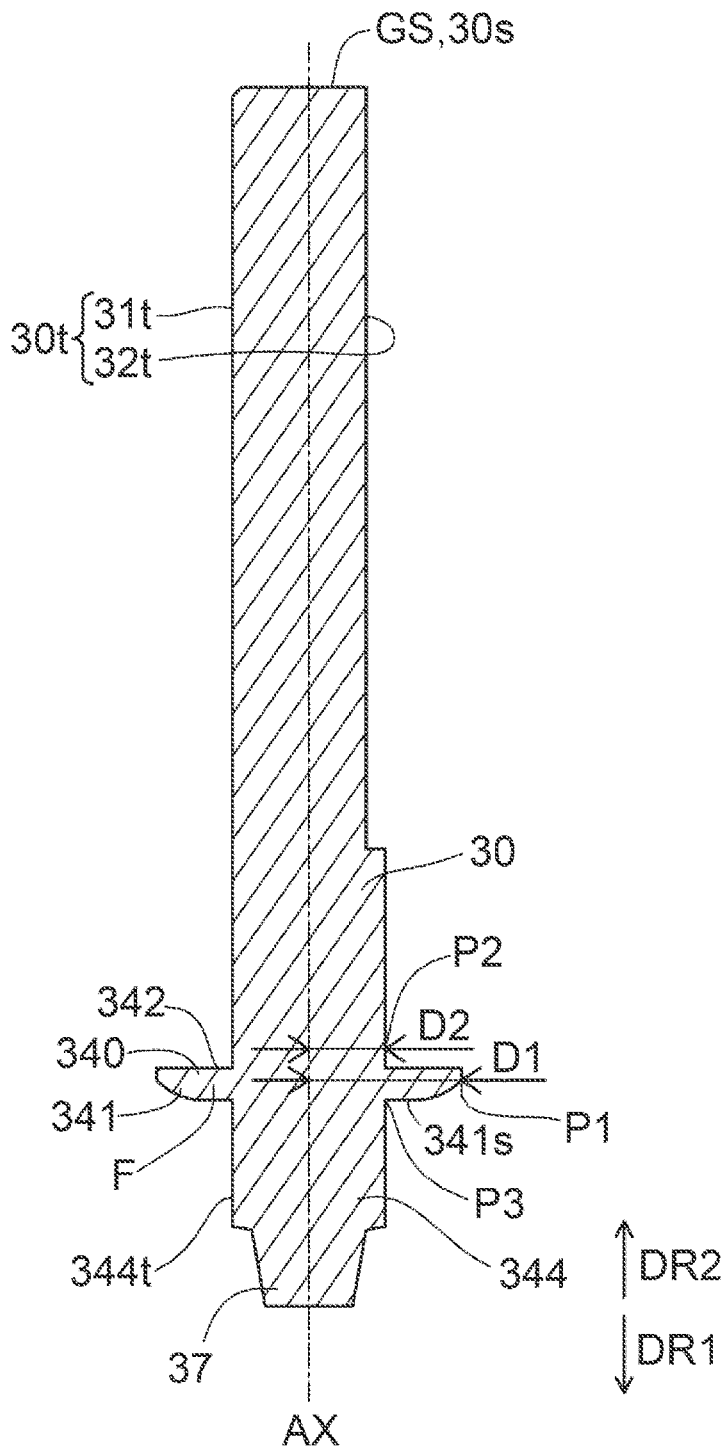
FIG. 6 is a schematic cross-sectional view of a stir pin according to the second embodiment, schematically illustrating this stir pin.

It is to be noted that from the viewpoint of more reliably preventing the material waste from entering the gap between the outer surface of the base end portion 30 of the stir pin 3A and the inner surface of the pin holder 8, the outer diameter of the ring-shaped receiving surface 341s is preferably larger than the outer diameter of the base end portion 30 of the stir pin 3A (see FIG. 6). In other words, the first radius D1 is preferably larger than the second radius D2.

In the example illustrated in FIG. 2, the ring-shaped receiving surface 341s includes a protruding curved surface (in other words, a curved surface protruding in the first direction DR1). In this case, the gap between the ring-shaped receiving surface 341s and the shoulder member 7 (more specifically, a first inner surface 72b, described later) becomes smaller. This prevents the material waste from entering the gap between the ring-shaped receiving surface 341s and the first inner surface 72b.

In the example illustrated in FIG. 2, an outer portion 3410s of the ring-shaped receiving surface 341s has an inclined surface TS, which is inclined in a direction toward the first axis AX as the inclined surface TS is closer to the stirring portion 37. In this case, an inner portion 3411s of the ring-shaped receiving surface 341s protrudes toward the first direction DR1 side beyond the outer portion 3410s of the ring-shaped receiving surface 341s. This diminishes the gap between the inner portion 3411s of the ring-shaped receiving surface 341s and the shoulder member 7 (more specifically, the first inner surface 72b). Thus, the material waste is prevented from entering the gap between the ring-shaped receiving surface 341s and the first inner surface 72b. The shape of the cross-section of the inclined surface TS (a cross-section cut along a plane including the first axis AX) may be a curvilinear shape, as exemplified in FIG. 2, or may be a linear shape.

First Portion 340 and Second Portion 344

In the example illustrated in FIG. 3A, the first portion 340 of the intermediate portion 34 is a portion provided further in the second direction DR2 than an end P3 of the ring-shaped receiving surface 341s on the first direction DR1 side. As exemplified in FIG. 2, when the stir pin 3A is mounted on the pin holder 8, the first portion 340 of the intermediate portion 34 is provided further in the first direction DR1 than the leading end portion 8e of the pin holder 8. Thus, the ring-shaped receiving surface 341s, which is provided at the first portion 340, prevents the material waste from attaching to the pin holder 8. Also, the first portion 340 is provided further in the second direction DR2 than the first inner surface 72b of the shoulder member 7. This enables the ring-shaped receiving surface 341s, which is provided at the first portion 340, to receive the material waste entering the shoulder member 7.

In the example illustrated in FIG. 3A, the second portion 344 of the intermediate portion 34 is a portion provided further in the first direction DR1 than the end P3 of the ring-shaped receiving surface 341s on the first direction DR1 side. Also, the second portion 344 of the intermediate portion 34 is a portion provided further in the second direction DR2 than the stirring portion 37. As exemplified in FIG. 2, in the configuration in which the shoulder member 7 is provided outside the stir pin 3A, the second portion 344 of the intermediate portion 34 is provided between the shoulder surface 72s and the ring-shaped receiving surface 341s. In the example illustrated in FIG. 2, part of the second portion 344 is provided in the first through hole 72h of the shoulder member 7.

When material waste has entered the shoulder member 7 through the first through hole 72h of the shoulder member 7, the material waste is guided by the outer surface 344t of the second portion 344 in a direction toward the ring-shaped receiving surface 341s. In a cross-section perpendicular to the first axis AX, an example shape of the outer surface 344t of the second portion 344 is a circular shape.

Stirring Portion 37

In the example illustrated in FIG. 3A, the stirring portion 37 has a tapered shape. The stirring portion 37 may be threaded on at least a part of the side surface. The shape of the cross-section of the stirring portion 37 cut along a plane perpendicular to the first axis AX may be a circular shape, an approximately polygonal shape (for example, a round-cornered triangle), or any other shape.

Base End Portion 30

In the example illustrated in FIG. 3A, the base end portion 30 of the stir pin 3A has an outer circumferential surface 30t and a base end surface 30s. The outer circumferential surface 30t may have a circular first surface 31t and a planar second surface 32t.

In the example illustrated in FIG. 2, the first surface 31t has a shape complementary to the inner circumferential surface of the pin holder 8, which defines the first hole 81h of the pin holder 8. In a cross-section perpendicular to the first axis AX, the first surface 31t has a circular shape.

The base end portion 30 has a pressed surface pressable by a first fixing member 83. In the example illustrated in FIG. 2, the pressed surface is the above-described second surface 32t. In a cross-section perpendicular to the first axis AX, the second surface 32t has a linear shape.

By pressing the pressed surface (more specifically, the second surface 32t), the first fixing member 83 fixes the base end portion 30 of the stir pin 3A to the pin holder 8 unmovably relative to the pin holder 8.

The base end portion 30 has a position adjustable surface GS, whose position in a direction along the first direction DR1 is adjustable by a stopper member 85, described later. In the example illustrated in FIG. 1, the position adjustable surface GS is the base end surface 30s. An example of the base end surface 30s is a flat surface. A mechanism for adjusting the position of the position adjustable surface GS using the stopper member 85 will be described later.

Shoulder Member 7

In the example illustrated in FIG. 2, the shoulder member 7 has the shoulder surface 72s and the first inner surface 72b. The shoulder surface 72s is a surface of the shoulder member 7 pointed in the first direction DR1, and the first inner surface 72b is a surface of the shoulder member 7 facing the ring-shaped receiving surface 341s.

In the example illustrated in FIG. 2, the position of the stir pin 3A is adjustable so that the gap between the first inner surface 72b of the shoulder member 7 and the ring-shaped receiving surface 341s is a minimal gap. In this case, it is difficult for the material waste to enter the gap between the first inner surface 72b and the ring-shaped receiving surface 341s.

As used herein, the term "minimal gap" is intended to mean a gap so small that material waste is substantially prevented from entering the gap. The size of the minimal gap (in other words, the gap between the first inner surface 72b and the ring-shaped receiving surface 341s) is, for example, 2 mm or less, 1 mm or less, or 0.5 mm or less.

In the example illustrated in FIG. 2, the shoulder member 7 has a second through hole 74h, in addition to the first through hole 72h. Through the second through hole 74h, the material waste entering the shoulder member 7 is discharged to the outside of the shoulder member 7.

In the example illustrated in FIG. 2, the first through hole 72h is provided on the shoulder surface 72s of the shoulder member 7. The first through hole 72h extends along the first direction DR1.

In the example illustrated in FIG. 2, the second through hole 74h is provided on the side surface of the shoulder member 7. The second through hole 74h extends in a direction crossing the first direction DR1 (for example, a direction orthogonal to the first direction DR1). In the example illustrated in FIG. 2, the number of second through holes 74h (in other words, through holes through which to discharge the material waste) that the shoulder member 7 has is one. Alternatively, the number of second through holes 74h that the shoulder member 7 has may be two, or three or more.

In the configuration in which the shoulder member 7 includes the second through hole 74h, the material waste is prevented from staying in the shoulder member 7. This, as a result, prevents the wear of the stir pin 3A and/or the pin holder 8 that may otherwise occur due to the friction between the stir pin 3A and/or the pin holder 8 and the material waste (more specifically, metal waste). Also in the configuration in which the material waste is discharged to the outside of the shoulder member 7, the material waste (more specifically, metal waste) is prevented from being stirred continuously in the shoulder member 7. This, as a result, prevents overheating of the stir pin 3A and/or the pin holder 8.

Thus, in the configuration in which the shoulder member 7 includes the second through hole 74h, the stir pin 3A and/or the pin holder 8 are kept in good condition. Thus, the lifetime (durability) of the stir pin 3A and/or the pin holder 8 is elongated. Also, as a result of the stir pin 3A and/or the pin holder 8 being kept in good condition, the joint surfaces of the workpieces are kept in good quality.

In the example illustrated in FIG. 2, from the viewpoint of efficiently discharging the material waste to the outside of the shoulder member 7, the position of the stir pin 3A is preferably adjustable so that a cross-section CS1 crosses the second through hole 74h. The cross-section CS1 passes through the outermost edge P1 of the ring-shaped receiving surface 341s and is perpendicular to the first axis AX. In this case, the material waste receives centrifugal force from the ring-shaped receiving surface 341s, and using this centrifugal force, the material waste can be guided to the second through hole 74h.

In the example illustrated in FIG. 2, an opening OP1 of the second through hole 74h on the second direction DR2 side is substantially covered by the ring-shaped receiving surface 341s; and an opening OP2 of the second through hole 74h on the first axis AX side is substantially covered by the outer circumferential surface (344t) of the stir pin 3A. In this case, the material waste entering the shoulder member 7 through the first through hole 72h is smoothly guided to the second through hole 74h.

In the example illustrated in FIG. 2, the outermost edge P1 of the ring-shaped receiving surface 341s is provided further in the first direction DR1 than an end P4 of the second through hole 74h on the second direction DR2 side. In this case, the material waste entering the shoulder member 7 is effectively prevented from moving in the second direction DR2 beyond the second through hole 74h. Thus, the material waste is prevented from staying in the shoulder member 7 for the elongated period of time that the material waste may otherwise take if the material waste came farther in the shoulder member 7 beyond the second through hole 74h.

The friction stir welding tool 100A (more specifically, the pin holder 8) preferably includes an adjustment mechanism G (see FIG. 1), which adjusts the position of the ring-shaped receiving surface 341s in the first direction DR1. This is from the viewpoint of adjusting the position of the ring-shaped receiving surface 341s so that the gap between the first inner surface 72b of the shoulder member 7 and the ring-shaped receiving surface 341s is a minimal gap; and/or the viewpoint of adjusting the position of the ring-shaped receiving surface 341s so that the outermost edge P1 of the ring-shaped receiving surface 341s is positioned further in the first direction DR1 than the end P4 of the second through hole 74h on the second direction DR2 side. Details of the adjustment mechanism G will be described later.

Pin Holder 8

In the example illustrated in FIG. 1, the friction stir welding tool 100A includes the pin holder 8, which is rotatable about the first axis AX together with the stir pin 3A.

The pin holder 8 includes: a holder body 80; the first hole 81h, which is for receiving the base end portion 30 of the stir pin 3A; and the first fixing member 83, which is for fixing the base end portion 30 of the stir pin 3A to the holder body 80.

The first hole 81h is provided in the holder body 80 and extends along the first direction DR1. In the example illustrated in FIG. 1, the first hole 81h is capable of receiving the base end portion 30 of the stir pin 3A, and is capable of receiving a leading end portion of the stopper member 85, described later.

In the example illustrated in FIG. 1, the holder body 80 has a second hole 82h. The second hole 82h is formed on the side wall of the holder body 80. The second hole 82h is connected to the first hole 81h.

In the second hole 82h, the first fixing member 83 is inserted. The first fixing member 83 is for fixing the base end portion 30 of the stir pin 3A. An example of the first fixing member 83 is a set screw. In the example illustrated in FIG. 2, the first fixing member 83 has an external screw portion 83a, which is screwable with an internal screw portion 82a, which is formed on the second hole 82h.

Adjustment Mechanism G

In the example illustrated in FIG. 1, the pin holder 8 includes the adjustment mechanism G, which adjusts the position of the ring-shaped receiving surface 341s. The adjustment mechanism G includes: the stopper member 85, which is contactable with the position adjustable surface GS (more specifically, the base end surface 30s) of the stir pin 3A; and a guide 86, which guides the movement of the stopper member 85.

The guide 86 is implemented by, for example, a third hole 86h, which is formed on the side wall of the pin holder 8 (more specifically, the holder body 80). In the example illustrated in FIG. 1, the third hole 86h is connected to the first hole 81h. The third hole 86h is inclined relative to the first hole 81h.

In the example illustrated in FIG. 1, the position of the stopper member 85 is adjustable along the guide 86 (more specifically, the third hole 86h). In this manner, the position of the stopper member 85 (more specifically, a stopper surface 85s, which is contactable with the position adjustable surface GS of the stir pin 3A) in a direction along the first direction DR1 is adjustable. By adjusting the position of the stopper surface 85s in a direction along the first direction DR1, the position of the position adjustable surface GS, which is provided to contact the stopper surface 85s, is adjusted. Also, by adjusting the position of the position adjustable surface GS, the position of the ring-shaped receiving surface 341s in the first direction DR1 is adjusted.

In the example illustrated in FIG. 1, the stopper member 85 is a set screw having an external screw portion that is screwabable with an internal screw portion 86a, which is formed on the third hole 86h.

In the example illustrated in FIG. 1, after the position of the stopper member 85 is adjusted, the stir pin 3A is inserted into the first hole 81h such that the stir pin 3A contacts the stopper member 85. Then, the stir pin 3A is fixed to the holder body 80 using the first fixing member 83. Thus, the stir pin 3A is positioned approximately relative to the pin holder 8 and is fixed to the pin holder 8.

Second Embodiment

Figure 4:
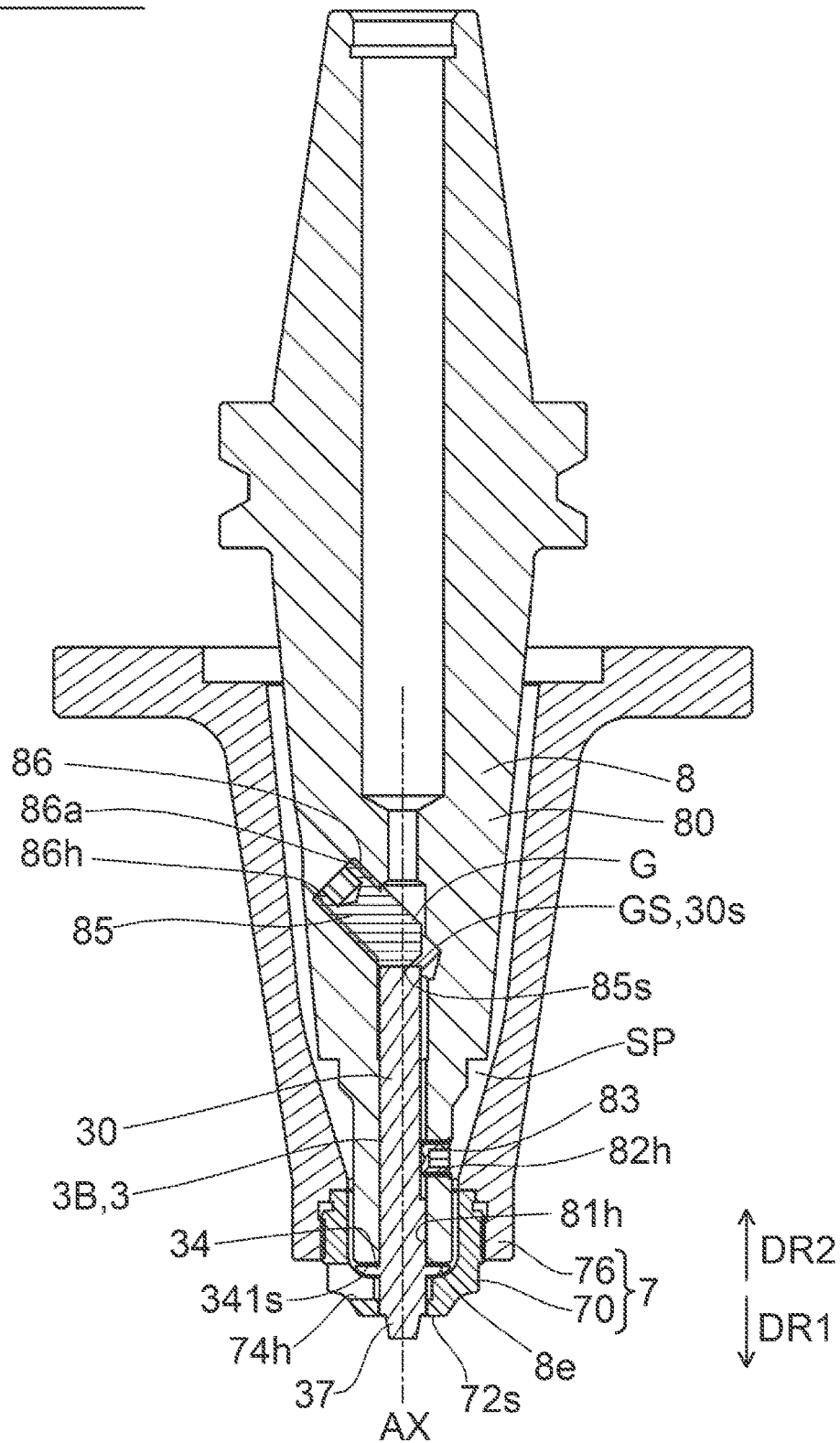
FIG. 4 is a schematic cross-sectional view of a friction stir welding tool according to a second embodiment, schematically illustrating this friction stir welding tool.
Figure 5:
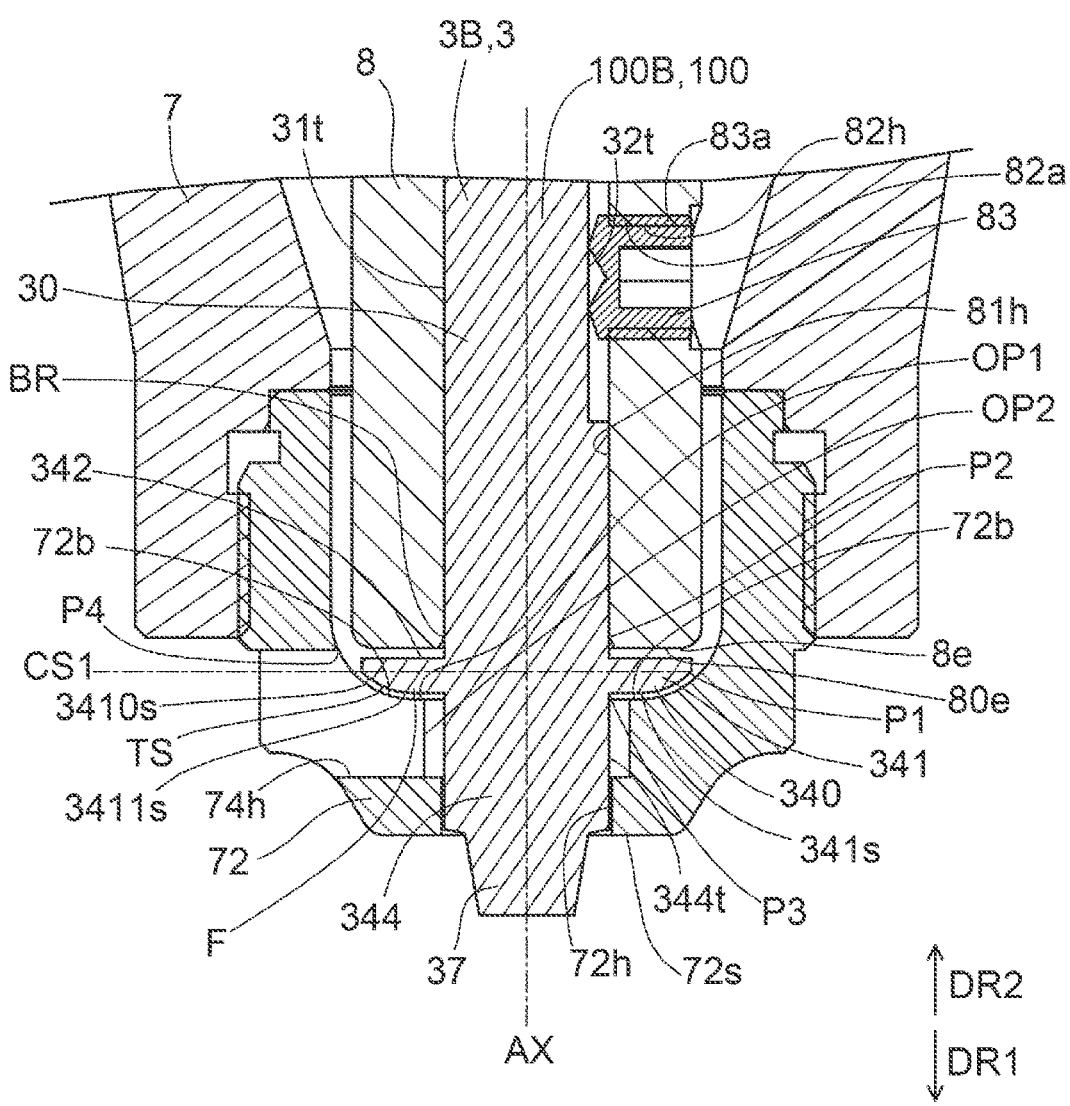
FIG. 5 is a schematic enlarged cross-sectional view of the friction stir welding tool according to the second embodiment, with part of the friction stir welding tool enlarged.
Figure 7:
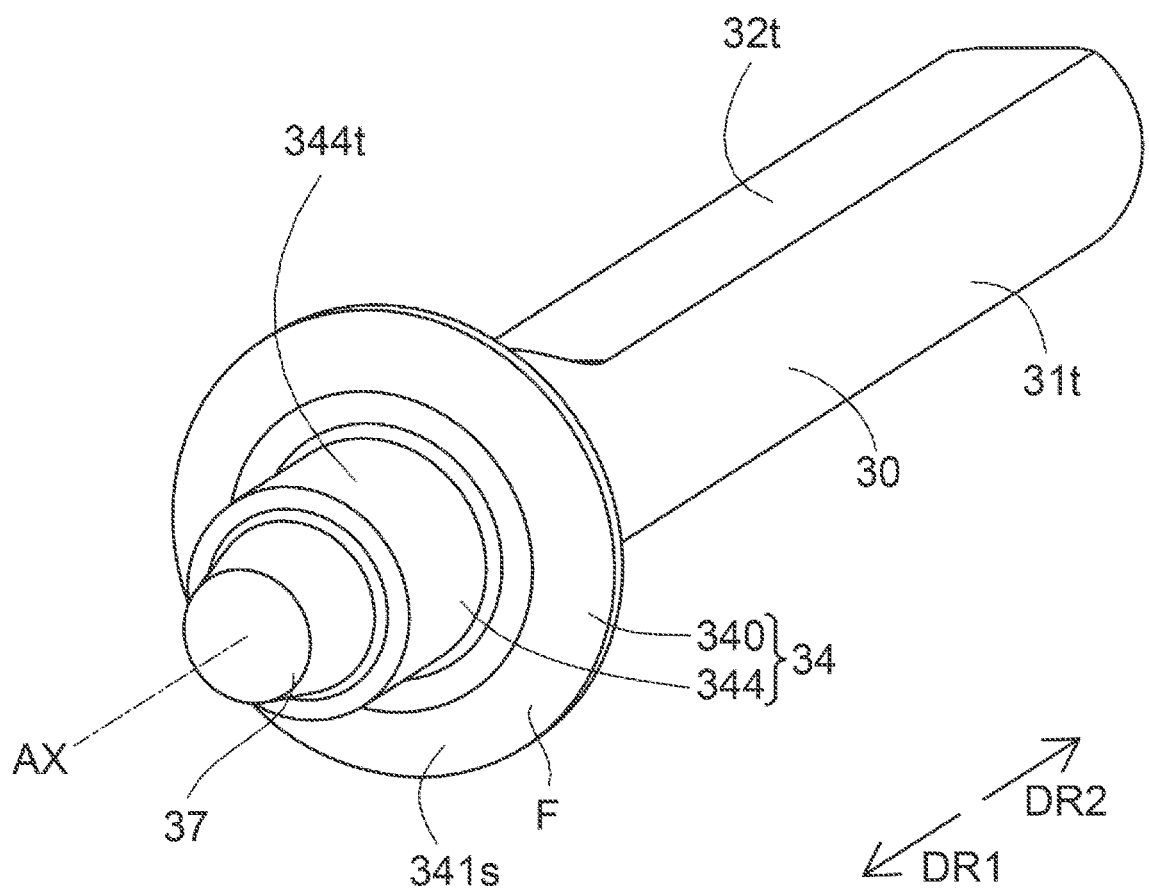
FIG. 7 is a schematic perspective view of the stir pin according to the second embodiment, schematically illustrating this stir pin.
Figure 8:
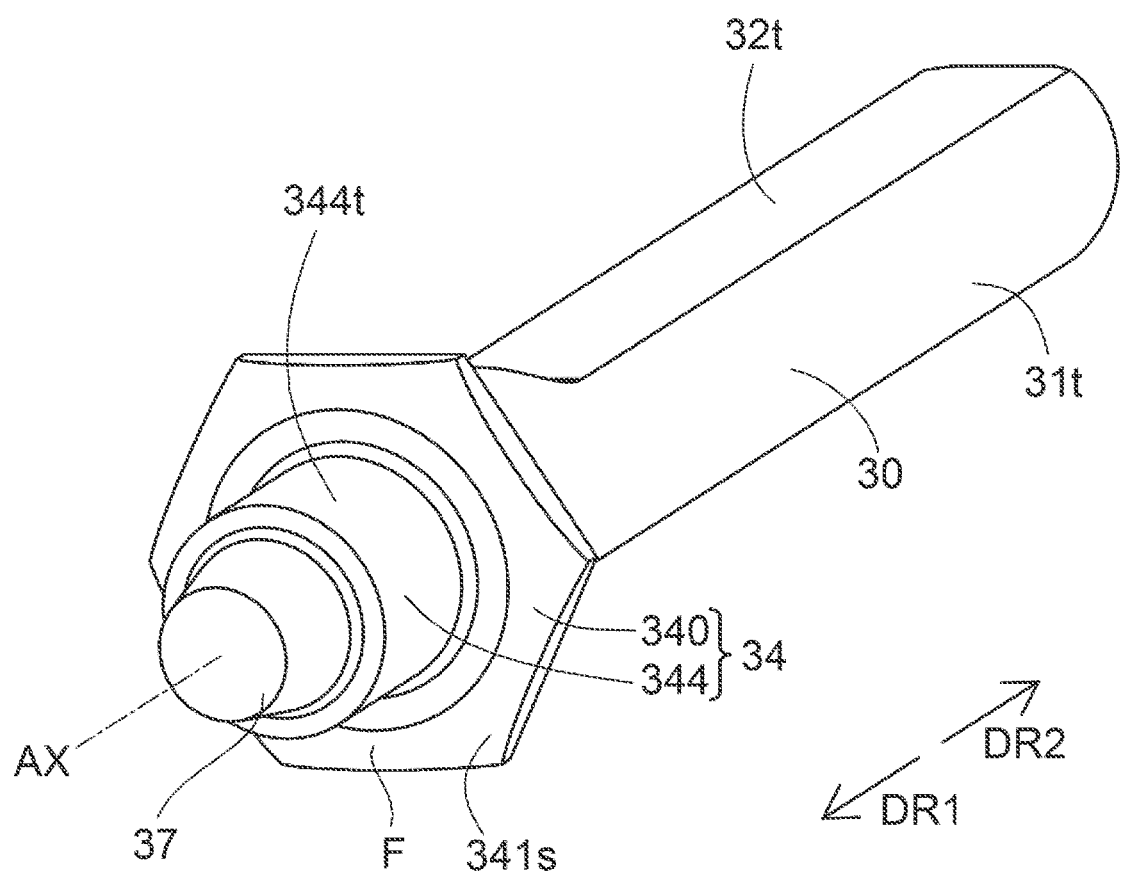
FIG. 8 is a schematic perspective view of a stir pin according to a first modification of the second embodiment, schematically illustrating this stir pin.
Figure 9:
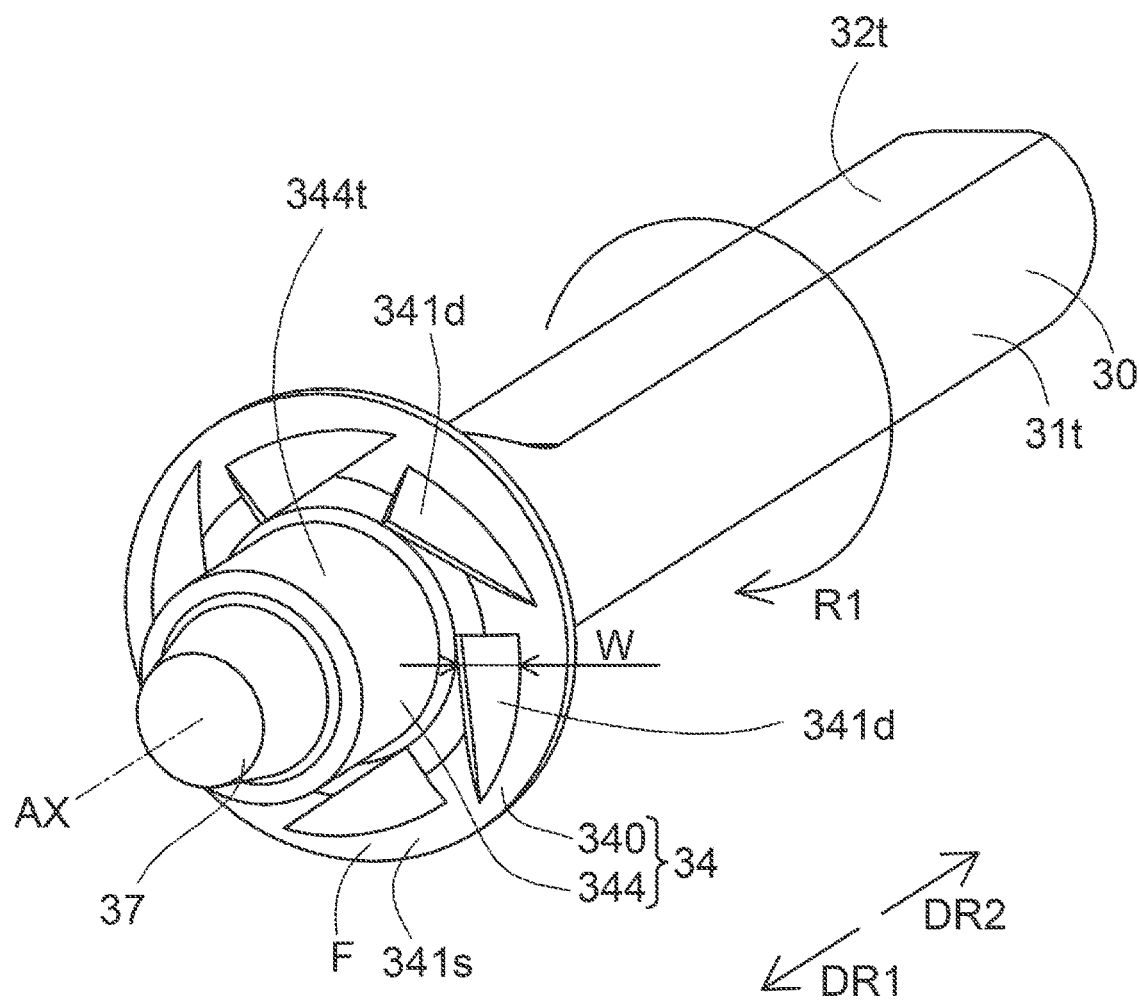
FIG. 9 is a schematic perspective view of a stir pin according to a second modification of the second embodiment, schematically illustrating this stir pin.
Figure 10:
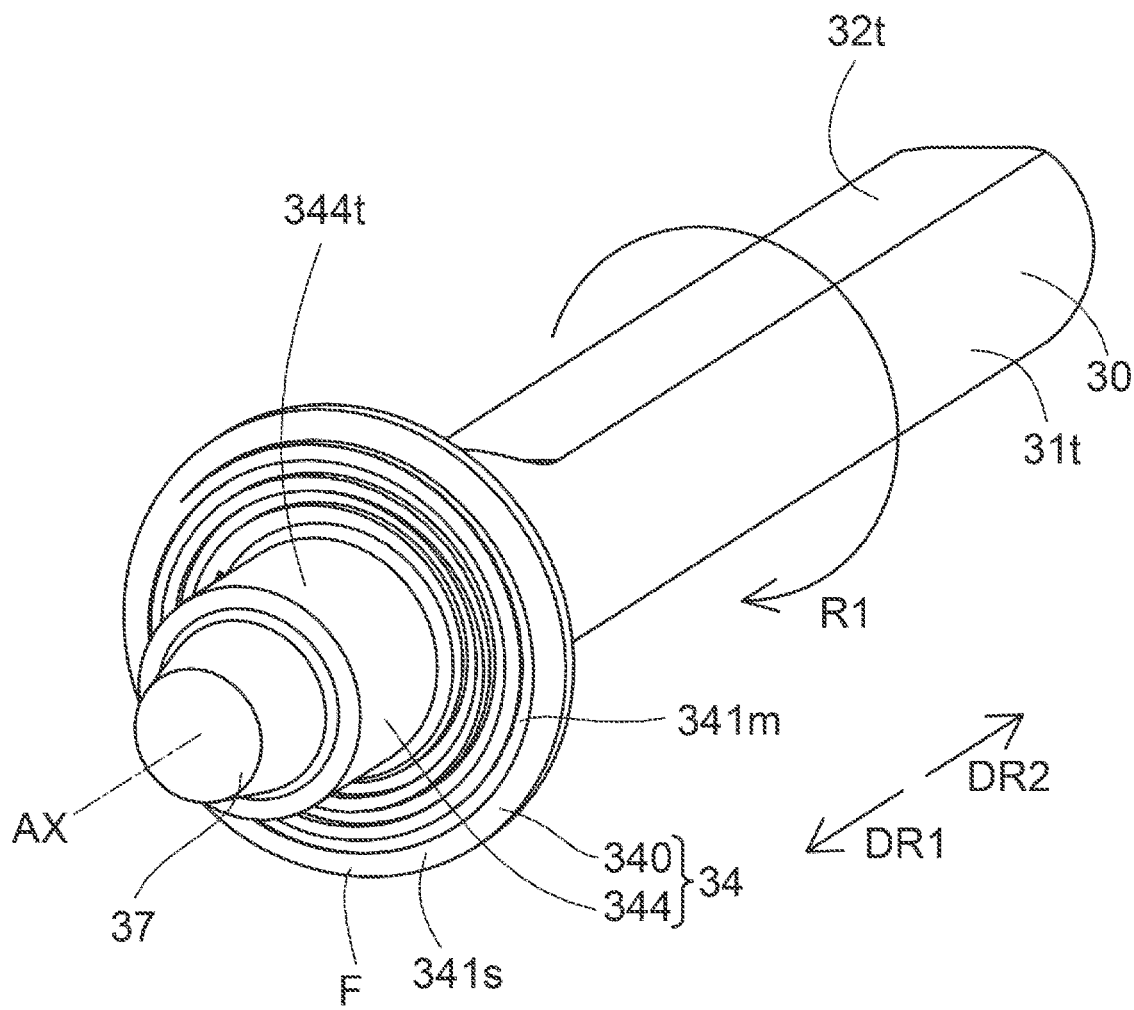
FIG. 10 is a schematic perspective view of a stir pin according to a third modification of the second embodiment, schematically illustrating this stir pin.

By referring to FIGS. 4 to 10, a friction stir welding tool 100B and a stir pin 3B according to the second embodiment will be described. FIG. 4 is a schematic cross-sectional view of the friction stir welding tool 100B according to the second embodiment, schematically illustrating this friction stir welding tool 100B. FIG. 5 is a schematic enlarged cross-sectional view of the friction stir welding tool 100B according to the second embodiment, with part of the friction stir welding tool 100B enlarged. FIG. 6 is a schematic cross-sectional view of the stir pin 3B according to the second embodiment, schematically illustrating this stir pin 3B. FIG. 7 is a schematic perspective view of the stir pin 3B according to the second embodiment, schematically illustrating this stir pin 3B. FIG. 8 is a schematic perspective view of a stir pin 3B according to a first modification of the second embodiment, schematically illustrating this stir pin 3B. FIG. 9 is a schematic perspective view of a stir pin 3B according to a second modification of the second embodiment, schematically illustrating this stir pin 3B. FIG. 10 is a schematic perspective view of a stir pin 3B according to a third modification of the second embodiment, schematically illustrating this stir pin 3B.

The stir pin 3B (or the friction stir welding tool 100B) according to the second embodiment is different from the stir pin 3A (or the friction stir welding tool 100A) according to the first embodiment in that the ring-shaped receiving surface 341s has a form of flange F. Otherwise, the stir pin 3B (or the friction stir welding tool 100B) according to the second embodiment is similar to the stir pin 3A (or the friction stir welding tool 100A) according to the first embodiment.

The following description of the second embodiment will primarily focus on the flange F and omit those descriptions already provided in the first embodiment, to avoid redundancy. Thus, it will be readily appreciated that those respects that are not explicitly described in the second embodiment but are described in the first embodiment apply in the second embodiment.

The stir pin 3B according to the second embodiment includes: a base end portion 30, which is holdable by the pin holder 8; an intermediate portion 34; and a stirring portion 37 (in other words, leading end portion). The structure and the shape of the base end portion 30 described in the first embodiment may be employed as the structure and the shape of the base end portion 30 of the stir pin 3B. The structure and the shape of the stirring portion 37 described in the first embodiment may be employed as the structure and the shape of the stirring portion 37 of the stir pin 3B.

As illustrated in FIG. 5, the intermediate portion 34 includes a first portion 340 and a second portion 344. The structure and the shape of the second portion 344 described in the first embodiment may be employed as the structure and the shape of the second portion 344 according to the second embodiment.

The first portion 340 is a portion provided further in the second direction DR2 than the end P3 of the ring-shaped receiving surface 341s on the first direction DR1 side. The second portion 344 is a portion provided further in the first direction DR1 than the end P3 of the ring-shaped receiving surface 341s on the first direction DR1 side.

In the example illustrated in FIG. 5, the first portion 340 includes a protrusion 341, which protrudes in a direction away from the first axis AX beyond the outer surface 344t of the second portion 344. In the example illustrated in FIG. 5, the protrusion 341 includes the flange F, which protrudes in a direction away from the first axis AX. The flange F may also be referred to as a brim or a disc.

In the example illustrated in FIG. 5, the surface (an example of "an end surface" recited in claims) of the flange F pointed in the first direction DR1 includes the ring-shaped receiving surface 341s. The shape of the ring-shaped receiving surface 341s described in the first embodiment may be employed as the shape of the ring-shaped receiving surface 341s according to the second embodiment. The position of the ring-shaped receiving surface 341s relative to the shoulder member 7 described in the first embodiment may be employed as the position of the ring-shaped receiving surface 341s relative to the shoulder member 7 (more specifically, the second through hole 74h) according to the second embodiment.

The stir pin 3B (or the friction stir welding tool 100B) according to the second embodiment has a ring-shaped receiving surface 341s. With this configuration, the stir pin 3B (or the friction stir welding tool 100B) according to the second embodiment provides effects similar to the effects provided by the stir pin 3A (or the friction stir welding tool 100A) according to the first embodiment.

Also, in the configuration in which the protrusion 341 includes the flange F, the surface of the flange F pointed in the second direction DR2 (in other words, a rear surface 342 of the flange F) is pointed to the leading end portion 8e (or a face 80e) of the pin holder 8 on the first direction DR1 side.

This configuration enables the flange F to cover (in other words, protect) at least a part of the leading end portion 8e of the pin holder 8 on the first direction DR1 side. The above configuration also enables the flange F to prevent material waste from attaching to the leading end portion 8e of the pin holder 8 on the first direction DR1 side.

In the example illustrated in FIG. 5, as seen from the direction from the stirring portion 37 toward the base end portion 30 (in other words, as seen from the direction along the second direction DR2), the boundary BR between the outer surface of the base end portion 30 of the stir pin 3B and the inner surface of the pin holder 8 is covered by the flange F. In this case, the material waste is prevented from entering the gap between the outer surface of the base end portion 30 of the stir pin 3B and the inner surface of the pin holder 8. As a result, the pin holder 8 and the stir pin 3B are prevented from being fixed to each other via the material waste. This makes the stir pin 3B easily detachable from the pin holder 8 (in other words, the stir pin 3B is made easily replaceable). Also, since no material waste enters the gap between the pin holder 8 and the stir pin 3B, the pin holder 8 is prevented from being deformed (more specifically, the first hole 81h, which receives the stir pin 3B, is prevented from being deformed).

In the example illustrated in FIG. 6, the outer diameter of the ring-shaped receiving surface 341s is larger than the outer diameter of the base end portion 30 of the stir pin 3B. In other words, a first imaginary circle is defined by an outermost edge P1 of the ring-shaped receiving surface 341s (that is, a point that is among the points on the ring-shaped receiving surface 341s and that is farthest from the first axis AX) rotating about the first axis AX, and the radius of the first imaginary circle is defined as a first radius D1 (an example of a half of "a maximum diameter"); and a second imaginary circle is defined by an outermost edge P2 of the base end portion 30 (that is, a point that is among the points on the outer circumferential surface of the base end portion 30 and that is farthest from the first axis AX) rotating about the first axis AX, and the radius of the second imaginary circle is defined as a second radius D2. In this case, the first radius D1 is larger the second radius D2. Also in the example illustrated in FIG. 6, the distance between the outermost edge P1 of the ring-shaped receiving surface 341s and the first axis AX is equal to the maximum distance between an arbitrary point on the outer circumferential surface of the stir pin 3B and the first axis AX.

In the configuration in which the first radius D1 is larger than the second radius D2, the boundary BR between the outer surface of the base end portion 30 of the stir pin 3B and the inner surface of the pin holder 8 is hidden behind the ring-shaped receiving surface 341s. This reliably prevents the material waste from entering the gap between the outer surface of the base end portion 30 of the stir pin 3B and the inner surface of the pin holder 8.

Stir Pin 3B According to First Modification

In the example illustrated in FIG. 7, the outer circumstantial shape of the flange F is a circular shape. Alternatively, as exemplified in FIG. 8, the outer circumstantial shape of the flange F may be a non-circular shape (for example, a polygonal shape such as a hexagonal shape).

Stir Pin 3B According to Second Modification

In the examples illustrated in FIGS. 7 and 8, the ring-shaped receiving surface 341s is a smooth surface. Alternatively, a protrusion, a depression, or a groove may be formed on the ring-shaped receiving surface 341s.

In the example illustrated in FIG. 9, a plurality of protrusions 341d are formed on the ring-shaped receiving surface 341s. In the configuration in which the plurality of protrusions 341d are formed on the ring-shaped receiving surface 341s, the material waste entering the gap between the ring-shaped receiving surface 341s and the shoulder member 7 is raked out by the plurality of protrusions 341d. In the example illustrated in FIG. 9, the plurality of protrusions 341d are arranged at equal angular intervals around the first axis AX. It is to be noted that the arrangement of the plurality of protrusions 341d will not be limited to the arrangement illustrated in FIG. 9; any other arrangement is possible.

Each of the protrusions 341d, which are formed on the ring-shaped receiving surface 341s, may have such a shape that a width W of the protrusion 341d in a radial direction of the protrusion 341d (in other words, a direction perpendicular to the first axis AX) gradually increases along a circumferential direction of the protrusion 341d (more specifically, a direction opposite to the rotation direction R1 of the stir pin 3B). Alternatively or additionally, each of the protrusions 341d, which are formed on the ring-shaped receiving surface 341s, may have such a shape that the height of the protrusion 341d (in other words, the height over which the protrusion 341d protrudes in the first direction DR1) gradually increases along the circumferential direction of the protrusion 341d (more specifically, the direction opposite to the rotation direction R1 of the stir pin 3B).

Stir Pin 3B According to Third Modification

In the example illustrated in FIG. 10, a groove (more specifically, a spiral groove 341m) is formed on the ring-shaped receiving surface 341s. The spiral groove 341m preferably has such a shape that the distance from the first axis AX gradually increases along the circumferential direction (more specifically, the direction opposite to the rotation direction R1 of the stir pin 3B). In this case, the spiral groove 341m rotates about the first axis AX together with the stir pin 3B, causing the material waste contacting the spiral groove 341m to move in a radially outward direction.

Third Embodiment

Figure 11:
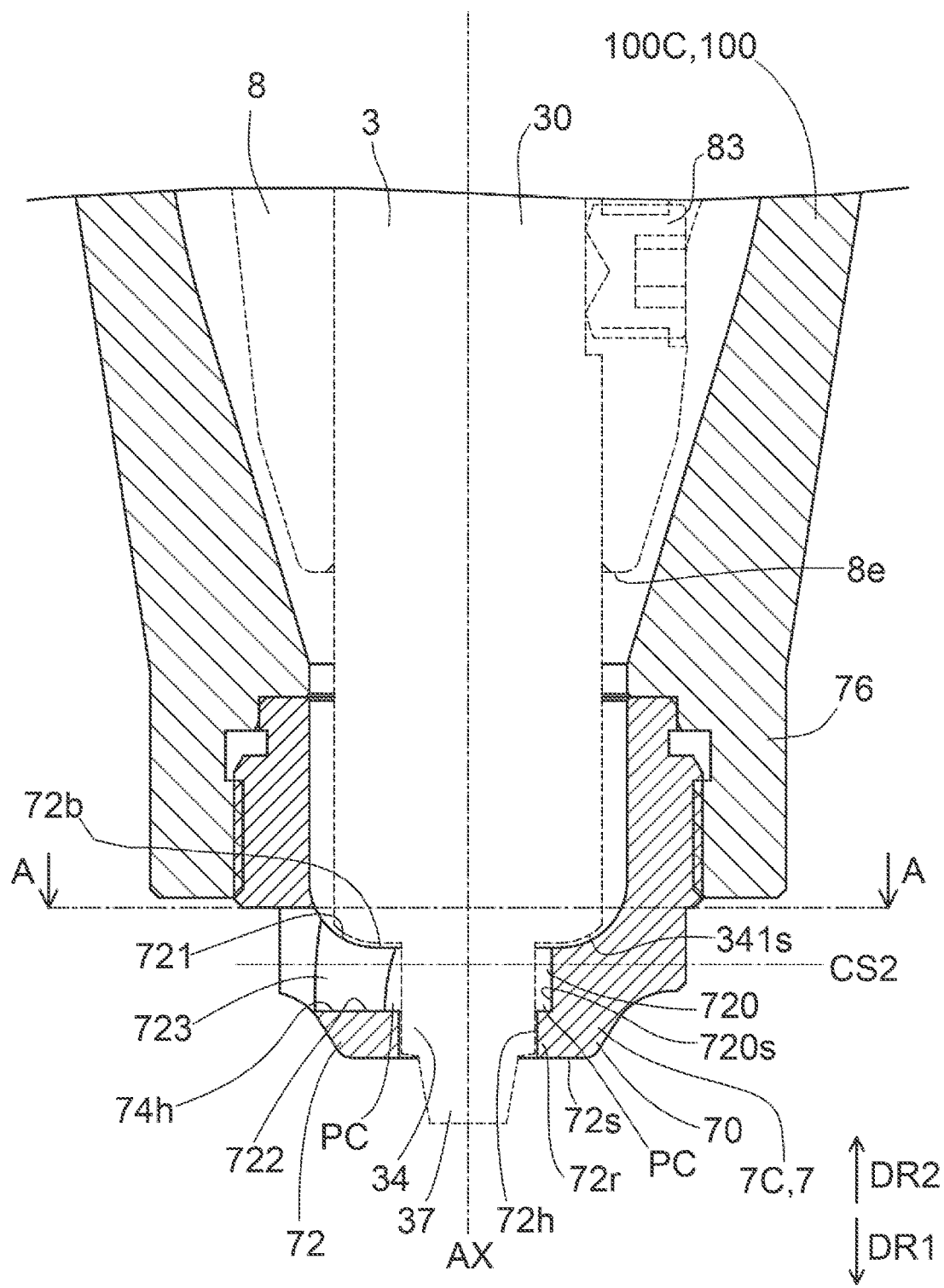
FIG. 11 is a schematic enlarged cross-sectional view of a friction stir welding tool according to a third embodiment, with part of the friction stir welding tool enlarged.
Figure 12:
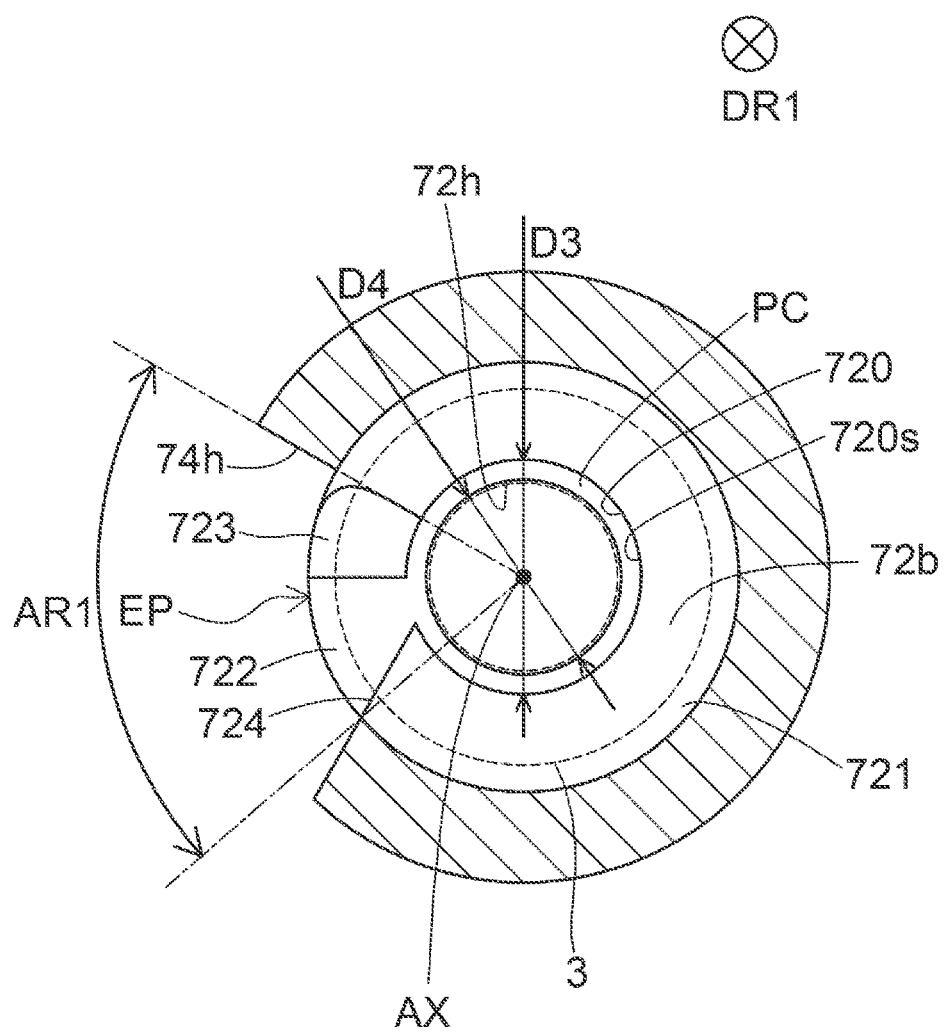
FIG. 12 is a cross-sectional view of the friction stir welding tool cut along a plane indicated by the arrow A-A illustrated in FIG. 11.

By referring to FIGS. 11 and 12, a shoulder member 7C and a friction stir welding tool 100C according to the third embodiment will be described. FIG. 11 is a schematic enlarged cross-sectional view of the friction stir welding tool 100C according to the third embodiment, with part of the friction stir welding tool 100C enlarged. FIG. 12 is a cross-sectional view of the friction stir welding tool 100C cut along a plane indicated by the arrow A-A illustrated in FIG. 11. In FIGS. 11 and 12, the stir pin 3 and the pin holder 8 are indicated by broken lines.

The shoulder member 7C (or the friction stir welding tool 100C) according to the third embodiment is characterized in the shape and the structure of the leading end portion 72 of the shoulder member 7. Otherwise, the shoulder member 7C (or the friction stir welding tool 100C) according to the third embodiment is similar to the shoulder member 7 (or the friction stir welding tool 100A) according to the first embodiment or to the shoulder member 7 (or the friction stir welding tool 100B) according to the second embodiment.

The following description of the third embodiment will primarily focus on the shoulder member 7C and omit those descriptions already provided in the first embodiment or the second embodiment, to avoid redundancy. Thus, it will be readily appreciated that those respects that are not explicitly described in the third embodiment but are described in the first embodiment or the second embodiment apply in the third embodiment.

The shoulder member 7 (more specifically, the leading end portion 72 of the shoulder member 7) has a first through hole 72*h*, through which the stir pin 3 is passed. The stir pin 3 according to the third embodiment may be the stir pin 3A according to the first embodiment, the stir pin 3B according to the second embodiment, or any other stir pin.

In the example illustrated in FIG. 11, the shoulder member 7 (more specifically, the leading end portion 72 of the shoulder member 7) includes a material waste receiving portion 720. The material waste receiving portion 720 is closer to the base end portion than the first through hole 72*h* is to the base end portion (in other words, the material waste receiving portion 720 is provided further in the second direction DR2 than the first through hole 72*h*).

In the example illustrated in FIG. 11, a pocket PC, which is for receiving the material waste, is defined by: a wall surface 720*s* (more specifically, the inner circumferential surface of the material waste receiving portion 720), which defines the material waste receiving portion 720; and the outer circumferential surface of the stir pin 3.

In the example illustrated in FIG. 11, the shoulder member 7 (more specifically, the leading end portion 72 of the shoulder member 7) has a second through hole 74*h*, through which the material waste is discharged. Also in the example illustrated in FIG. 11, the pocket PC is connected to the second through hole 74*h*. In this case, the material waste temporarily stored in the pocket PC is discharged to the outside of the shoulder member 7 through the second through hole 74*h*.

In the example illustrated in FIG. 11, the number of second through holes 74*h* (in other words, discharge holes) that the shoulder member 7 has is one. Alternatively, the number of second through holes 74*h* that the shoulder member 7 has may be two or more.

In the example illustrated in FIG. 11, the end of the pocket PC on the second direction DR2 side is covered by the ring-shaped receiving surface 341*s*. In this case, the material waste entering the pocket PC is smoothly guided to the second through hole 74*h* by the ring-shaped receiving surface 341*s*. Also in the example illustrated in FIG. 11, the end of the pocket PC on the first direction DR1 side is substantially covered by an inward protrusion 72*r*, which is provided at the leading end portion 72 of the shoulder member 7. This ensures that the inward protrusion 72*r* reduces the intrusion of the material waste into the pocket PC.

In the example illustrated in FIG. 11, the material waste receiving portion 720 is provided such that a cross-section CS2 crosses the second through hole 74*h*. The cross-section CS2 passes through the material waste receiving portion 720 and is perpendicular to the first axis AX. In this case, the material waste received in the material waste receiving portion 720 is smoothly moved to the second through hole 74*h* using centrifugal force.

In the example illustrated in FIG. 12, the inner diameter, D3, of the material waste receiving portion 720 is larger than the inner diameter, D4, of the first through hole 72*h*. In this case, the material waste entering the shoulder member 7 through the first through hole 72*h* is smoothly received in the material waste receiving portion 720.

In the example illustrated in FIG. 12, the first inner surface 72*b* of the shoulder member 7 (in other words, the surface pointed to the ring-shaped receiving surface 341*s* or the surface pointed in the second direction DR2) has a first area 721 and a second area 722, which is depressed in the first direction DR1 beyond the first area 721. The first area 721 and the second area 722 may be connected to each other via an inclined surface 723. Alternatively or additionally, the first area 721 and the second area 722 may be connected to each other via a step 724. In the example illustrated in FIG. 12, the inclined surface 723 is provided at one side portion of the second area 722, and the step 724 is provided at an opposite side portion of the second area 722.

In the example illustrated in FIG. 12, the first inner surface 72*b* of the shoulder member 7 has the first area 721 and the second area 722, which is depressed in the first direction DR1 beyond the first area 721. In this case, the material waste entering the internal region (more specifically, the pocket PC) of the material waste receiving portion 720 is smoothly guided to the region of a back portion of the second area 722 (when the stirring portion 37 is pointed downward, the region of the back portion of the second area 722 corresponds to the region immediately over the second area 722).

In the configuration in which the first inner surface 72*b* of the shoulder member 7 includes the inclined surface 723, the material waste entering the minimal gap between the first area 721 and the ring-shaped receiving surface 341*s* is smoothly guided to the region of the back portion of the second area 722 through the inclined surface 723. In the configuration in which the step 724 is provided between the first area 721 and the second area 722, it is difficult for the material waste guided to the region of the back portion of the second area 722 to enter the minimal gap between the first area 721 and the ring-shaped receiving surface 341*s*.

In the example illustrated in FIG. 12, as seen from a direction along the first axis AX, the second area 722 is provided in an angle range AR1, which extends from the first axis AX toward a discharge opening EP of the second through hole 74*h*. In this case, the material waste guided to the region of the back portion of the second area 722 is moved smoothly toward the discharge opening EP of the second through hole 74*h*.

In the example illustrated in FIG. 12, as seen from the direction along the first axis AX, the inclined surface 723 may be provided in the angle range AR1, which extends from the first axis AX toward a discharge opening EP of the second through hole 74*h*.

Fourth Embodiment

Figure 13:
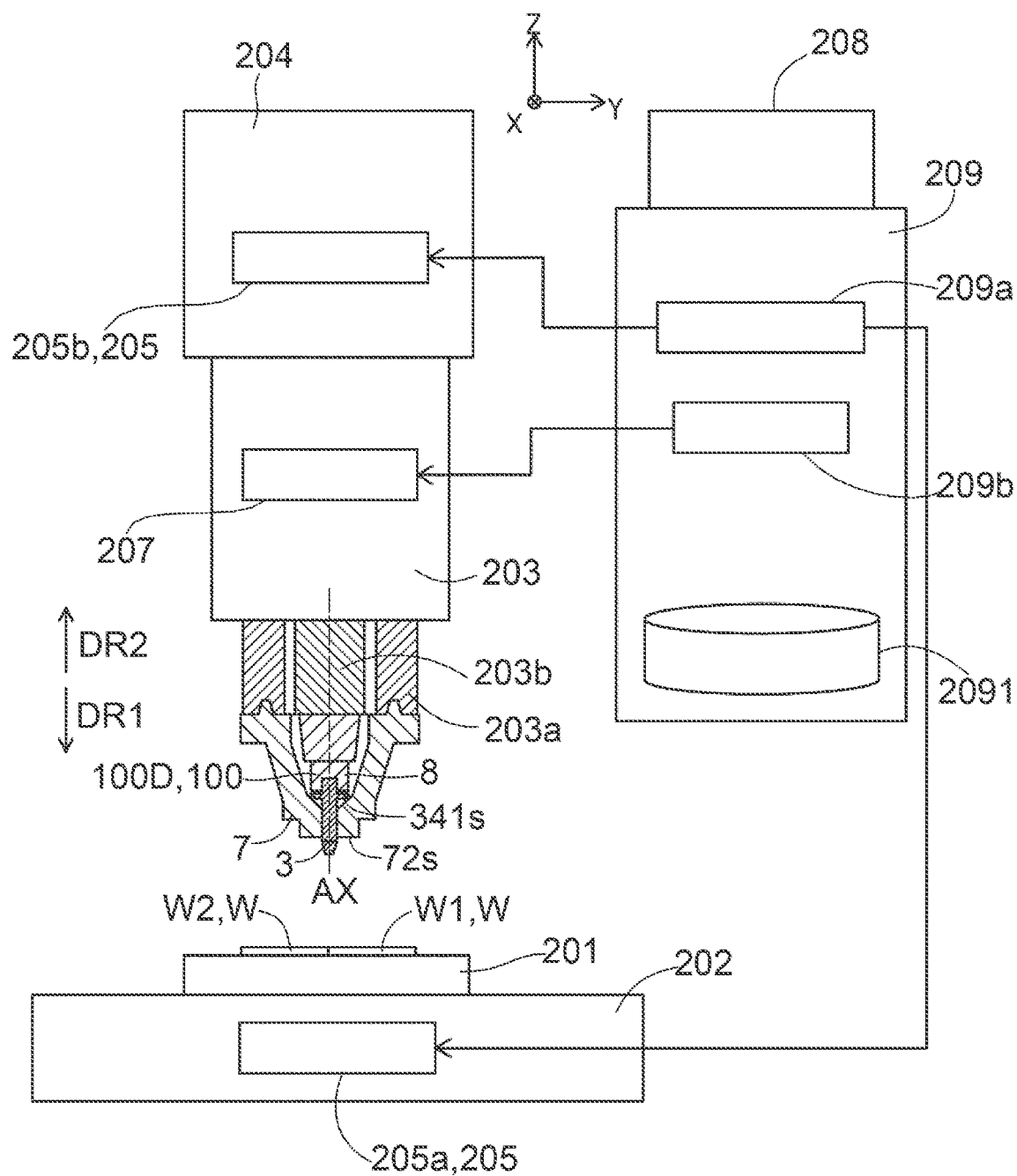
FIG. 13 is a schematic partial cross-sectional view of a machine tool according to a fourth embodiment, schematically illustrating this machine tool.

By referring to FIG. 13, a machine tool 200 according to the fourth embodiment will be described. FIG. 13 is a schematic partial cross-sectional view of the machine tool 200 according to the fourth embodiment, schematically illustrating this machine tool 200.

The machine tool 200 includes: a friction stir welding tool 100D; a workpiece support member 201; a tool support member 203, which supports the friction stir welding tool 100D; a first driver 205, which moves the tool support member 203 relative to the workpiece support member 201; a second driver 207, which drives the stir pin 3 into rotation; and a controller 209.

An example of the friction stir welding tool 100D according to the fourth embodiment is the friction stir welding tool (100A, 100B, 100C) according to any one of the above-described embodiments. The friction stir welding tool has already been described in the first to third embodiments, and a redundant description of the friction stir welding tool is omitted.

The workpiece support member 201 supports workpieces W, which are to-be-worked objects (more specifically, to-bejoined objects). An example of the workpiece support member 201 is a support table to which the workpieces W are fixed. In the example illustrated in FIG. 13, the workpiece support member 201 (support table) supports a first workpiece W1 and a second workpiece W2. The first workpiece W1 and the second workpiece W2 are joined together using the friction stir welding tool 100D. The first workpiece W1 and the second workpiece W2 may be joined together continuously (in other words, linearly) using the friction stir welding tool 100D. Alternatively, the first workpiece W1 and the second workpiece W2 may be spot-welded (in other words, point-welded) together using the friction stir welding tool 100D.

In the example illustrated in FIG. 13, the machine tool 200 includes a base 202 and a driver 205a (for example, a support table driver), which moves the workpiece support member 201 relative to the base 202. The driver 205a is one example of the first driver 205, which moves the tool support member 203 relative to the workpiece support member 201.

The tool support member 203 supports the friction stir welding tool 100D. In the example illustrated in FIG. 13, the tool support member 203 includes: a frame 203a, to which the shoulder member 7 is fixed; and a shaft 203b, which transmits rotational force to the pin holder 8. The tool support member 203 may also be referred to as a headstock. The shaft 203b may also be referred to as a rotation spindle.

In the example illustrated in FIG. 13, the machine tool 200 includes a second base 204 and a driver 205b, which moves the tool support member 203 relative to the second base 204. The driver 205b is another example of the first driver 205, which moves the tool support member 203 relative to the workpiece support member 201.

The first driver 205 is a device that moves the tool support member 203 relative to the workpiece support member 201. In the example illustrated in FIG. 13, the first driver 205 includes: the driver 205a, which moves the workpiece support member 201 relative to the base 202; and the driver 205b, which moves the tool support member 203 relative to the second base 204. Alternatively, the first driver 205 may include only one of the driver 205a and the driver 205b.

In the example illustrated in FIG. 13, the driver 205a is a device that moves the workpiece support member 201 in a direction along a horizontal plane (in other words, in a direction along the X-Y plane).

In the example illustrated in FIG. 13, the driver 205b is a device that moves the tool support member 203 three-dimensionally. In other words, the driver 205b is capable of moving the tool support member 203 in a direction along the X axis, capable of moving the tool support member 203 in a direction along the Y axis, and capable of moving the tool support member 203 in a direction along the Z axis. In the example illustrated in FIG. 13, the Z axis is a direction along a vertical direction and is a direction parallel to the first direction DR1.

The second driver 207 drives the stir pin 3 into rotation. More specifically, the second driver 207 is connected to the shaft 203b in such a manner that motive power can be transmitted to the shaft 203b. With this configuration, the second driver 207 drives the stir pin 3 into rotation via the shaft 203b and the pin holder 8.

The controller 209 controls the first driver 205 and the second driver 207. In the example illustrated in FIG. 13, the controller 209 includes: first driver controlling means 209a, which controls the first driver 205; and second driver controlling means 209b, which controls the second driver 207.

Upon receipt of a control signal from the controller 209 (more specifically, the first driver controlling means 209a), the first driver 205 moves the workpiece support member 201 and/or the tool support member 203. In other words, upon receipt of a control signal from the controller 209, the first driver 205 moves the tool support member 203 relative to the workpiece support member 201.

Upon receipt of a control signal from the controller 209 (more specifically, the second driver controlling means 209b), the second driver 207 rotates the stir pin 3 about the first axis AX. More specifically, upon receipt of a control signal from the controller 209, the second driver 207 rotates the shaft 203b. The rotation of the shaft 203b is transmitted to the stir pin 3 via the pin holder 8. Thus, the stir pin 3 rotates about the first axis AX.

In the example illustrated in FIG. 13, the controller 209 includes a storage device 2091 (in other words, a memory), which stores programs and data. By executing a program stored in the storage device 2091, the controller 209 serves as the first driver controlling means 209a and/or the second driver controlling means 209b.

In the example illustrated in FIG. 13, the machine tool 200 includes an input device 208, through which parameters such as a control parameter are input into the controller 209.

The machine tool 200 includes the friction stir welding tool 100 according to any one of the above-described embodiments. The friction stir welding tool 100 that the machine tool 200 according to the fourth embodiment includes provides effects similar to the effects provided by the friction stir welding tools 100 according to the first to third embodiments. The machine tool 200 according to the fourth embodiment also includes the first driver 205, the second driver 207, and the controller 209. With this configuration, the machine tool 200 is capable of joining the first workpiece W1 and the second workpiece W2 together in any desired form by moving the tool support member 203 relative to the workpiece support member 201 and by rotating the stir pin 3.

Also in the example illustrated in FIG. 13, the shoulder member 7 is mounted on the frame 203a, which is not rotationally drivable. In this case, the force that the shoulder member 7 (more specifically, the shoulder surface 72s) receives from the workpieces W is supported by the frame 203a. This ensures that not a large amount of axial load acts on the bearing provided between the tool support member 203 and the shaft 203b. With this configuration, the machine tool 200 according to the fourth embodiment is capable of rotating the shaft 203b at high speed. In view of this capability, the machine tool 200 according to the fourth embodiment may not necessarily be a machine dedicated to friction stir welding. In other words, the machine tool 200 according to the fourth embodiment may be a multi-tasking machine capable of performing both friction stir welding and machining. In this case, in order to perform friction stir welding, the friction stir welding tool 100 may be attached to the tool support member 203; and in order to perform machining, a machining tool may be attached to the tool support member 203.

The present invention will not be limited to the above-described embodiments; it will be appreciated that the embodiments may be modified or changed in any manner deemed convenient within the technical spirit and scope of the present invention. It will also be appreciated that the various kinds of technology and/or technique used in one embodiment are applicable to the other embodiments unless a technical contradiction occurs. Further, it will be appreciated that the optional configurations in each embodiment may be omitted if deemed necessary.

Figure 14:
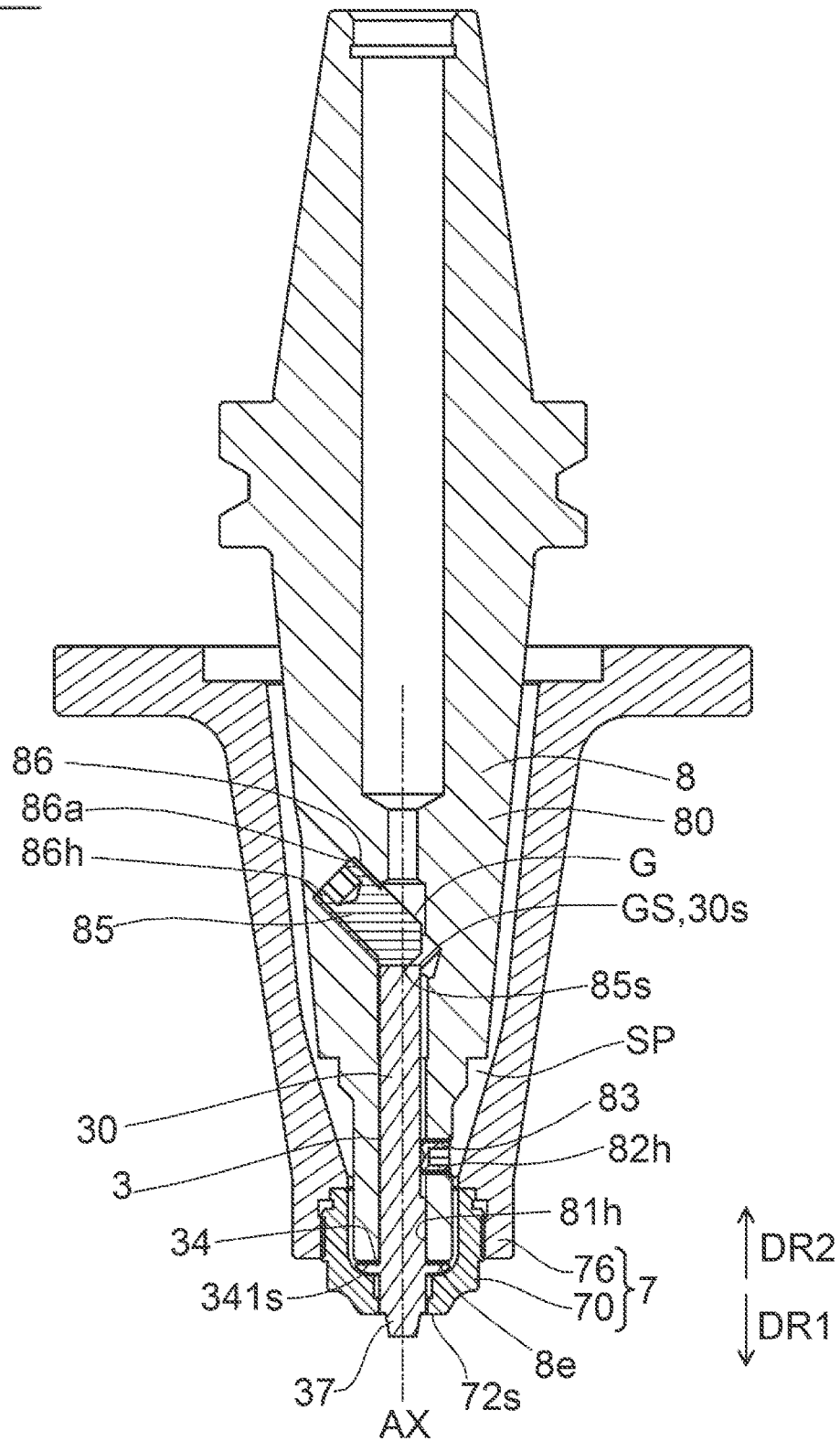
FIG. 14 is a schematic cross-sectional view of a friction stir welding tool according to a modification of an embodiment, schematically illustrating this friction stir welding tool.

For example, in the above-described embodiments, the shoulder member 7 is described as including the second through hole 74h (in other words, a discharge hole). Alternatively, as exemplified in FIG. 14, the shoulder member 7 may not necessarily be provided with the second through hole 74h.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A stir pin comprising:
   a base end portion configured to be held in a pin holder to be rotatable about a first axis, the base end portion having a maximum outer diameter at an outermost edge about the first axis;
   a stirring portion provided to project from a shoulder member to be rotatable with respect to the shoulder member about the first axis together with the base end portion; and
   an intermediate portion comprising:
      a second portion connected to the stirring portion to be rotatable about the first axis together with the stirring portion and having a second diameter passing through the first axis; and
      a first portion provided between and connected to the base end portion and the second portion to be rotatable about the first axis together with the base end portion and the second portion, the first portion having an end surface to which the second portion is connected coaxially with the first portion and which has a maximum diameter passing through the first axis larger than the second diameter, the end surface having a ring-shaped receiving surface configured to receive a material waste generated when the stirring portion performs a friction stirring, the ring-shaped receiving surface having a maximum outer diameter at an outermost edge about the first axis that is equal to or greater than the maximum outer diameter of the base end portion,
   wherein the first portion includes a flange that has the end surface.

2. The stir pin according to claim 1, wherein the ring-shaped receiving surface has an inclined surface that is inclined with respect to the first axis as the inclined surface extends from the outermost edge of the ring-shaped receiving surface toward the second portion.

3. The stir pin according to claim 1, wherein the base end portion has a position adjustable surface whose position along the first axis is adjustable by a stopper member.

4. The stir pin according to claim 1, wherein the flange is coaxial with the first axis.

5. A stir pin comprising:
   a base end portion configured to be held in a pin holder to be rotatable about a first axis;
   a stirring portion provided to project from a shoulder member to be rotatable with respect to the shoulder member about the first axis together with the base end portion; and
   an intermediate portion comprising:
      a second portion connected to the stirring portion to be rotatable about the first axis together with the stirring portion and having a second diameter passing through the first axis; and
      a first portion provided between and connected to the base end portion and the second portion to be rotatable about the first axis together with the base end portion and the second portion, the first portion having an end surface to which the second portion is connected coaxially with the first portion and which has a maximum diameter passing through the first axis larger than the second diameter, the end surface having a ring-shaped receiving surface configured to receive a material waste generated when the stirring portion performs a friction stirring,
   wherein the ring-shaped receiving surface faces in a direction toward the stirring portion, the ring-shaped receiving surface having a protrusion, a depression, or a groove formed thereon.

6. A friction stir welding tool comprising:
   a shoulder member having a shoulder surface configured to press a workpiece; and
   a stir pin provided in the shoulder member rotatable about a first axis with respect to the shoulder member, the stir pin comprising:
      a base end portion configured to be held in a pin holder to be rotatable about the first axis, the base end portion having a maximum outer diameter at an outermost edge about the first axis;
      a stirring portion provided to project from the shoulder member to be rotatable with respect to the shoulder member about the first axis together with the base end portion; and
      an intermediate portion comprising:
         a second portion connected to the stirring portion to be rotatable about the first axis together with the stirring portion and having a second diameter passing through the first axis; and
         a first portion provided between and connected to the base end portion and the second portion to be rotatable about the first axis together with the base end portion and the second portion, the first portion having an end surface to which the second portion is connected coaxially with the first portion and which has a maximum diameter passing through the first axis larger than the second diameter, the end surface having a ring-shaped receiving surface configured to receive a material waste generated when the stirring portion performs a friction stirring, the ring-shaped receiving surface having a maximum outer diameter at an outermost edge about the first axis that is equal to or greater than the maximum outer diameter of the base end portion, wherein the shoulder member has
 a first through hole which is provided at a leading end portion of the shoulder member and through which the stir pin projects from the leading end portion, and
 a second through hole through which the material waste in the shoulder member is discharged to an outside of the shoulder member, and wherein the second through hole is provided at least partly radially outward from the second portion along the first axis.

7. The friction stir welding tool according to claim 6,
wherein the shoulder member has a first inner surface opposite to the ring-shaped receiving surface, and
wherein a position of the stir pin is adjustable so that a gap between the first inner surface and the ring-shaped receiving surface is minimized.

8. The friction stir welding tool according to claim 6, wherein a position of the stir pin is adjustable so that a cross-section which is perpendicular to the first axis and which passes through an outermost edge of the ring-shaped receiving surface crosses the second through hole.

9. The friction stir welding tool according to claim 6, further comprising:
an adjustment mechanism configured to adjust a position of the ring-shaped receiving surface.

10. A machine tool comprising:
a friction stir welding tool;
a workpiece support member configured to support a workpiece;
a tool support member supporting the friction stir welding tool;
a first driver configured to move the tool support member relative to the workpiece support member;
a second driver configured to rotate a stir pin;
a controller configured to control the first driver and the second driver; and
the friction stir welding tool comprising:
 a shoulder member having a shoulder surface configured to press a workpiece;
 a pin holder; and
 a stir pin provided in the shoulder member rotatable about a first axis with respect to the shoulder member, the stir pin comprising:
  a base end portion configured to be held in the pin holder to be rotatable about the first axis, the base end portion having a maximum outer diameter at an outermost edge about the first axis;
  a stirring portion provided to project from the shoulder member to be rotatable with respect to the shoulder member about the first axis together with the base end portion; and
  an intermediate portion comprising:
   a second portion connected to the stirring portion to be rotatable about the first axis together with the stirring portion and having a second diameter passing through the first axis; and a first portion provided between and connected to the base end portion and the second portion to be rotatable about the first axis together with the base end portion and the second portion, the first portion having an end surface to which the second portion is connected coaxially with the first portion and which has a maximum diameter passing through the first axis larger than the second diameter, the end surface having a ring-shaped receiving surface configured to receive a material waste generated when the stirring portion performs a friction stirring, the ring-shaped receiving surface having a maximum outer diameter at an outermost edge about the first axis that is equal to or greater than the maximum outer diameter of the base end portion, wherein the shoulder member has
 a first through hole which is provided at a leading end portion of the shoulder member and through which the stir pin projects from the leading end portion, and
 a second through hole through which the material waste in the shoulder member is discharged to an outside of the shoulder member, and wherein the second through hole is provided at least partly radially outward from the second portion along the first axis.

11. The friction stir welding tool according to claim 6, wherein the ring-shaped receiving surface has an inclined surface that is inclined with respect to the first axis as the inclined surface extends from the outermost edge of the ring-shaped receiving surface toward the second portion.

12. The friction stir welding tool according to claim 6, wherein the base end portion has a position adjustable surface whose position along the first axis is adjustable by a stopper member.

13. The friction stir welding tool according to claim 6, wherein the first portion includes a flange which is coaxial with the first axis and which has the end surface.

14. The stir pin according to claim 1, wherein the stirring portion, the intermediate portion, and the base end portion are integrally formed.

15. The stir pin according to claim 1, wherein the flange is defined by the ring-shaped receiving surface facing in a direction toward the stirring portion and a rear surface facing in a direction away from the stirring portion, the rear surface extending in a direction orthogonal to the first axis.

16. The stir pin according to claim 1, wherein the ring-shaped receiving surface faces in a direction toward the stirring portion, the ring-shaped receiving surface having a spiral groove formed thereon.

17. The friction stir welding tool according to claim 6, further comprising an adjustment mechanism configured to adjust a position of the ring-shaped receiving surface in a direction defined as a direction from the base end portion toward the stirring portion, the adjustment mechanism including a stopper member contactable with a base end surface of the base end portion.

18. The friction stir welding tool according to claim 17, wherein the adjustment mechanism includes a guide configured to guide a movement of the stopper member.

19. The friction stir welding tool according to claim 18, wherein the pin holder comprises:
a holder body;
a first hole that is formed in the holder body and that is configured to receive the base end portion of the stir pin;

a first fixing member configured to fix the base end portion of the stir pin to the holder body; and a second hole that is formed in the holder body and through which the first fixing member is inserted.

20. The friction stir welding tool according to claim 6, wherein the first portion includes a flange, the flange being defined by the ring-shaped receiving surface facing in a direction toward the stirring portion and a rear surface facing in a direction away from the stirring portion, the rear surface extending in a direction orthogonal to the first axis.

21. The machine tool according to claim 10, wherein the first portion includes a flange, the flange being defined by the ring-shaped receiving surface facing in a direction toward the stirring portion and a rear surface facing in a direction away from the stirring portion, the rear surface extending in a direction orthogonal to the first axis.

22. The machine tool according to claim 10, wherein the ring-shaped receiving surface has an inclined surface that is inclined with respect to the first axis as the inclined surface extends from the outermost edge of the ring-shaped receiving surface toward the second portion.

\* \* \* \* \*